United States Patent
Choi et al.

(10) Patent No.: US 7,146,903 B2
(45) Date of Patent: Dec. 12, 2006

(54) DUAL CAPACITY COMPRESSOR

(75) Inventors: Cheal Lak Choi, Gimhae-Si (KR); Dal Soo Kang, Changwon-Si (KR); Chul Gi Rho, Changwon-Si (KR); Min Young Seo, Changwon-Si (KR); Kee Joo Kim, Changwon-Si (KR); June Soo Hur, Changwon-Si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/530,291

(22) PCT Filed: Oct. 31, 2003

(86) PCT No.: PCT/KR03/02320

§ 371 (c)(1),
(2), (4) Date: Apr. 5, 2005

(87) PCT Pub. No.: WO2004/040138

PCT Pub. Date: May 13, 2004

(65) Prior Publication Data

US 2006/0081122 A1    Apr. 20, 2006

(30) Foreign Application Priority Data

Oct. 31, 2002 (KR) .................. 10-2002-0067277
Oct. 31, 2002 (KR) .................. 10-2002-0067278

(51) Int. Cl.
*F04B 1/06* (2006.01)
*F01B 31/14* (2006.01)
*F15B 15/24* (2006.01)

(52) U.S. Cl. .................. 92/13; 92/140; 417/221
(58) Field of Classification Search .................. 92/13, 92/13.4, 13.7, 140; 417/221, 315
See application file for complete search history.

(56) References Cited

U.S. PATENT DOCUMENTS

| | | | |
|---|---|---|---|
| 4,236,874 A * | 12/1980 | Sisk | ............... 417/315 |
| 5,951,261 A | 9/1999 | Paczuski | |
| 6,190,137 B1 | 2/2001 | Robbins | |
| 6,446,451 B1 | 9/2002 | Monk | |
| 6,755,624 B1 * | 6/2004 | Bae et al. | ............... 92/13 |
| 6,918,335 B1 * | 7/2005 | Choi et al. | ............... 92/13 |

* cited by examiner

Primary Examiner—Edward K. Look
Assistant Examiner—Michael Leslie
(74) Attorney, Agent, or Firm—Birch, Stewart, Kolasch and Birch, LLP

(57) ABSTRACT

Dual capacity compressor including a power generating part (20) having a reversible motor (21, 22) and a crank shaft (23) inserted in the motor (21, 23), a compression part (30) having a cylinder (32), a piston (31), and a connecting rod (33), a crank pin (110) in an upper part of the crank shaft (23) eccentric to an axis of the crank shaft, an eccentric sleeve (120) rotatably fitted to the crank pin (110), and the connecting rod (33) respectively, a key member (130) for positive fastening of the eccentric sleeve (120) to the crank pin (110) in all rotation directions of the motor, and an eccentric mass (200) provided to the eccentric sleeve (120) for rotating the eccentric sleeve (120) around the crank pin (110), thereby preventing relative motion between components that sustain the eccentricity, and permitting a smooth motion between the components.

37 Claims, 19 Drawing Sheets

DUAL CAPACITY COMPRESSOR

TECHNICAL FIELD

The present invention relates to compressors for compressing a working fluid, such as refrigerant, to a required pressure, and more particularly, to a compressor of which compression capacity changes with a direction of rotation.

BACKGROUND ART

The dual capacity compressor is a kind of reciprocating type compressor of which piston stroke and compression capacity changes with rotation directions of a motor and a crankshaft, which is made by means of an eccentric sleeve rotatably coupled with a crank pin of a crankshaft. Since the dual capacity compressor has a compression capacity that can be changed depending on a required load, the dual compressor is used widely in apparatuses which require compression of working fluid, particularly in home appliances operative in a refrigeration cycle, such as a refrigerator, for enhancing an operation efficiency. A U.S. Pat. No. 4,236,874 discloses a general dual capacity compressor, referring to which a related art dual capacity compressor will be described, briefly.

FIG. 1 illustrates a section of a dual capacity compressor disclosed in the U.S. Pat. No. 4,236,874, and FIG. 2 illustrates operation of the dual capacity compressor, schematically.

Referring to FIG. 1, the dual capacity compressor is provided with a piston 7 in a cylinder 8, a crankshaft 1, a crank pin 3 having an axis 3a eccentric from an axis 1a of the crankshaft 1, an eccentric ring 4 coupled with the crank pin 3, and a connecting rod 6 connected between the eccentric ring 4 and the piston 7, as key components. The eccentric ring 4 and the connecting rod 6 are rotatable with respect to each other, as well as the axis 3a of the crank pin. There are release areas 9 in contact surfaces of the crank pin 3 and the eccentric ring 4 respectively, and a key 5 for coupling the crank pin 3 with the eccentric ring 4 in the release areas. The operation of the dual capacity compressor with respect to the compression capacity will be described. As shown in FIG. 2, in the dual capacity compressor, a stroke of the piston 7 is regulated by an eccentricity varied with a position of the eccentric ring 4, wherein, if a large capacity is required, the crank shaft 1 is rotated in a clockwise direction (regular direction) and, if a small capacity is required, the crank shaft 1 is rotated in a counter clockwise direction (reverse direction). In detail, FIG. 2A illustrates a moment the piston 7 is at a top dead center during a clockwise direction rotation, and FIG. 2B illustrates a moment the piston 7 is at a bottom dead center during a clockwise direction rotation, when the stroke Lmax is the greatest because the eccentricity is the greatest. FIG. 2C illustrates a moment the piston 7 is at a bottom dead center during a counter clockwise direction rotation, and FIG. 2D illustrates a moment the piston 7 is at a top dead center during a counter clockwise direction rotation, when the stroke Lmin is the smallest because the eccentricity is the smallest.

However, during the foregoing operation, the crank pin 3 and the eccentric ring 4 are involved in centrifugal forces, respectively caused by their rotation around the axis 1a of the crank shaft, exerting on an extension line between the shaft axis 1a and the pin axis 3a, and between the shaft axis 1a to the a center of gravity of the ring 4a, respectively. Therefore, different from FIGS. 2A and 2B, in cases of FIGS. 2C and 2D, as lines of actions are not on the same line, a local rotating moment is taken place at the eccentric ring 4 with respect to the pin 3 as a product of a vertical distance 'd' to the pin 3 and its own centrifugal force, acting in a direction the same with a direction (counter clockwise direction) of rotation of the crank shaft 1. Since the crank pin 3 and the eccentric ring 4 are members that can make relative motion to each other, the rotating moment causes a relative rotation of the eccentric ring 4 in a direction of rotation of the crank shaft 1, releasing the key 5 both from the crank pin 3 and the eccentric ring 4, and leaving the eccentric ring 4 and the key 5 to move in the rotation direction as shown in dashed lines in FIG. 3. Moreover, as shown in FIG. 3 for an example, during clockwise direction operation, a pressure 'P' (a pressure of re-expansion of the working fluid) in the cylinder after compression pushes the eccentric ring 4 to a direction of rotation of the crank shaft 1, to cause the eccentric ring 4 to make a relative rotation with respect to the crank pin 3 in a rotation direction of the crank shaft. At the end, such a relative rotation makes operation of the compressor unstable, to fail to obtain a desired compression performance.

In fact, the relative rotation is occurred because the key 5 fails to hold both the crank pin 3 and the eccentric ring, perfectly. The key 5 rolls within the release area whenever the direction of rotation of the crank shaft is changed, to cause serious wear at respective contact surfaces, that shortens a lifetime of the compressor.

Other than the U.S. Pat. No. 4,236,874, there are many patent publications that disclose technologies of the dual capacity compressors, which will be described, briefly.

Similarly, U.S. Pat. No. 4,479,419 discloses a dual capacity compressor provided with a crank pin, eccentric cam and a key. The key is fixed to the eccentric cam, and moves along a track in a crank pin when a direction of rotation of the compressor is changed. However, since the key can not hold both the crank pin and the eccentric cam, positively, the U.S. Pat. No. 4,479,419 also has unstable operation caused by the relative rotation.

U.S. Pat. No. 5,951,261 discloses a compressor having an eccentric part with an inside diameter of bore formed across the eccentric part, and an eccentric cam with another bore with an inside diameter the same with the eccentric part formed in one side thereof. A pin is provided to the bore in the eccentric part, and a compression spring is provided in the bore in the eccentric sleeve. Accordingly, when the bores are aligned during rotation, the pin moves into the bore in the cam by a centrifugal force, to hold the eccentric part and the eccentric cam, together. However, in the U.S. Pat. No. 5,951,261, since the eccentric cam is provided with only one bore therein, the eccentric part and the eccentric cam can hold together only when the compressor rotates in a particular direction. Moreover, an operative reliability can not be secured, since an exact movement of the pin from the eccentric part to the cam through the bores is difficult.

In the meantime, basically, each of the dual capacity compressors described before employs eccentric members, such as an eccentric ring and an eccentric cam, and changes a stroke distance of the piston and the compression capacity with eccentricities of the eccentric members. Because relative arrangements of the eccentric members with members around the eccentric members change with the rotation directions of the compressor, the change of the eccentricity takes place. Therefore, for causing an appropriate amount of change of the eccentricity, it is also important to arrange the eccentric members at required positions accurately before the perfect coupling of the eccentric members.

DISCLOSURE OF INVENTION

An object of the present invention is to provide a dual capacity compressor which can maintain a constant eccentricity and make a stable operation even if the compressor is rotated in any directions that have different compression capacity.

As described, the inventor understands that the unstable operation of the dual capacity compressor is caused by a local centrifugal force of the eccentric sleeve, and an external load through the connecting rod and etc., during operation. Though such causes are not avoidable as far as an eccentric mechanism is used, the inventor understand that, if the crank pin and the eccentric sleeve can be coupled positively during operation, such a problem can be solved. Taking an idea of a key member that has such a coupling feature, the key member and members related thereto are modified to prevent the relative rotation between the crank pin and the eccentric sleeve.

Moreover, as known, the eccentricity and the stroke distance of the piston vary with direct, or relative rotation to other adjoining members, of the eccentric sleeve. Therefore, the inventor modifies the compressor further such that the eccentric sleeve rotates smoothly, and arranged accurately in view of an operative reliability of the compressor.

Accordingly, the present invention provides a dual capacity compressor including a power generating part including a reversible motor and a crank shaft inserted in the motor, a compression part having a cylinder, a piston in the cylinder, and a connecting rod connected to the piston, a crank pin in an upper part of the crank shaft eccentric to an axis of the crank shaft, an eccentric sleeve having an inside circumferential surface rotatably fitted to an outside circumferential surface of the crank pin, and an outside circumferential surface rotatably fitted to an end of the connecting rod, a key member for positive fastening of the eccentric sleeve to the crank pin in all rotation directions of the motor, and an eccentric mass provided to the eccentric sleeve for rotating the eccentric sleeve around the crank pin.

The key member holds the eccentric sleeve at a plurality of points, and more preferably the key member holds the eccentric sleeve at two points set up with reference to a center line in any direction during operation.

The components will be described in more detail.

The crank pin includes one pair of key member fitting parts formed opposite to each other.

The crank pin further includes at least one first oil supply hole for supplying oil between the eccentric sleeve and the crank pin, and the first oil supply hole is formed in the crank shaft so as to be in communication with an oil passage for supplying oil to various moving parts of the compressor. Preferably, the crank pin has one pair of first oil supply holes formed in the crank pin opposite to each other.

The eccentric sleeve includes a track part formed along a circumference thereof for enabling rotation of the eccentric sleeve itself relative to the projection of the key member, and a limiting part formed relative to the track part for limiting rotation of the projection of the key member. The track part of the eccentric sleeve is a cut away part cut along a circumferential direction at a depth from a top thereof, or a pass through hole extended along a circumferential direction to a length at a depth from the top thereof.

Preferably, the steps formed between the track part and the limiting part is parallel to an extension line connecting an axis of the crank shaft and an axis of the crank pin, and more preferably, the step is spaced apart from an extension line connecting the axis of the crank shaft and the axis of the crank pin as much as a distance equal to a half of a thickness of the key member.

The eccentric sleeve further includes at least one second oil supply hole in communication with the first oil supply hole in the crank pin. The eccentric sleeve further includes oil cavities formed in an outside circumferential surface thereof around the second oil supply hole, and an oil groove extended from the second oil supply hole vertically in the outside circumferential surface.

The key member includes a first projection for projecting a length from the crank pin and engaging with the step of the eccentric sleeve, a first stopper for limiting the length of projection of the first projection, and a second projection for projecting in a direction opposite to the first projection and engaging with the step on the other side of the eccentric sleeve during rotation.

Preferably, the key member further includes an elastic member for being inserted on the second projection and supporting the first projection so that the first projection is projected continuously regardless of an operation state of the compressor. Preferably, the key member further includes a second stopper for limiting a length of projection of the second projection from the crank pin depending on a direction of the centrifugal force.

The eccentric mass rotates the eccentric sleeve so as to be held at a part of the key member, and generates a rotation moment with a centrifugal force for rotating the eccentric sleeve.

Preferably, the eccentric mass rotates the eccentric sleeve in a direction the same with a relative friction generated at the eccentric sleeve, and in a direction opposite to a rotation direction of the crank shaft. The eccentric mass is provided to a part of the eccentric sleeve, of which weight is light relatively, and preferably adjacent to the track part of the eccentric sleeve.

The eccentric sleeve is a plate member provided to the outside circumferential surface of the eccentric sleeve on an upper part of the eccentric sleeve. The eccentric mass is formed as one unit with the eccentric sleeve, or formed separate from the eccentric sleeve, and fixed to the eccentric sleeve.

Thus, the dual capacity compressor of the present invention prevents the relative rotation between the crank pin and the eccentric sleeve, permitting a stable operation of the compressor and an improvement of an efficiency. The eccentric sleeve is arranged accurately to provide a desired eccentricity, to secure an operation reliability of the compressor, as well.

BRIEF DESCRIPTION OF DRAWINGS

The accompanying drawings, which are included to provide a further understanding of the invention, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings. In describing the embodiments of the present invention, same parts will be given the same names and reference symbols, and repetitive descriptions of which will be omitted. An overall structure of the dual capacity compressor of the present invention will be described, with reference to FIG. 4.

Figure 1:
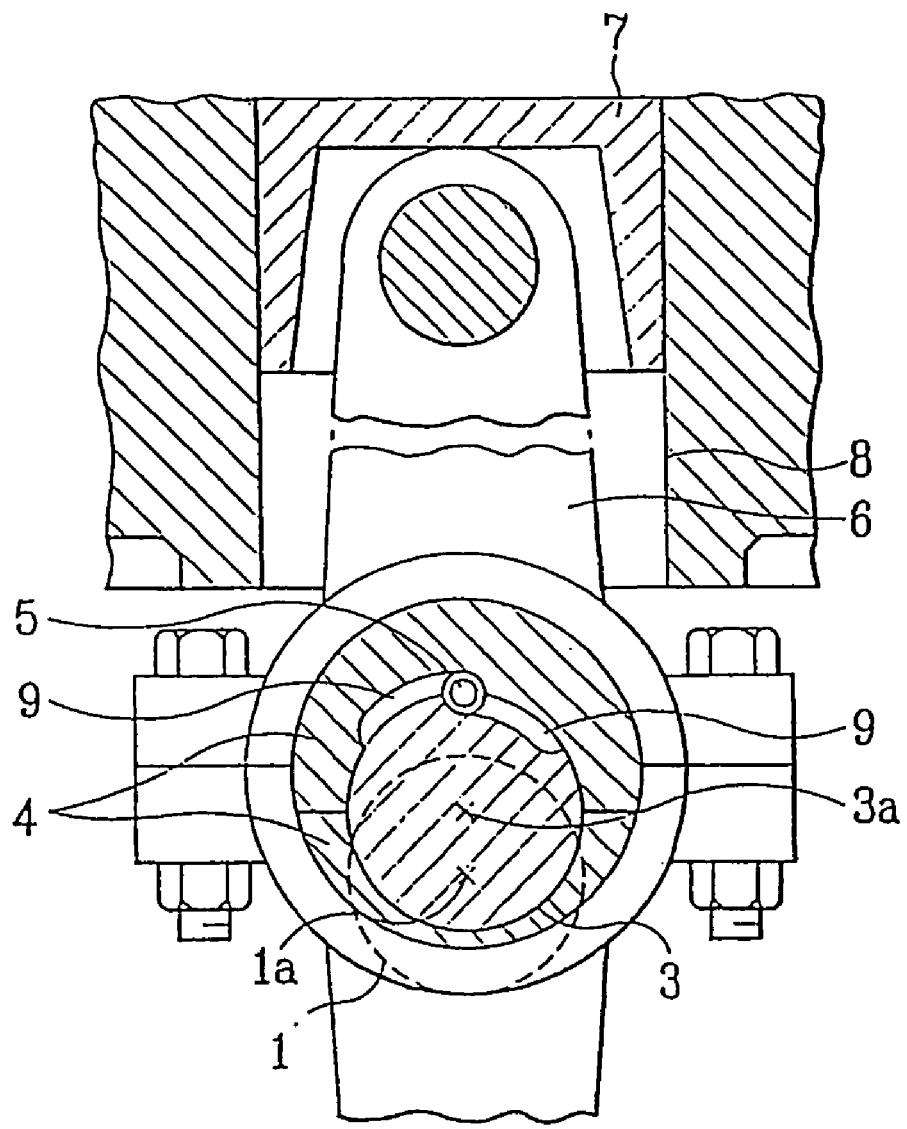
FIG. 1 illustrates a section of a related art dual capacity compressor.
Figure 2:
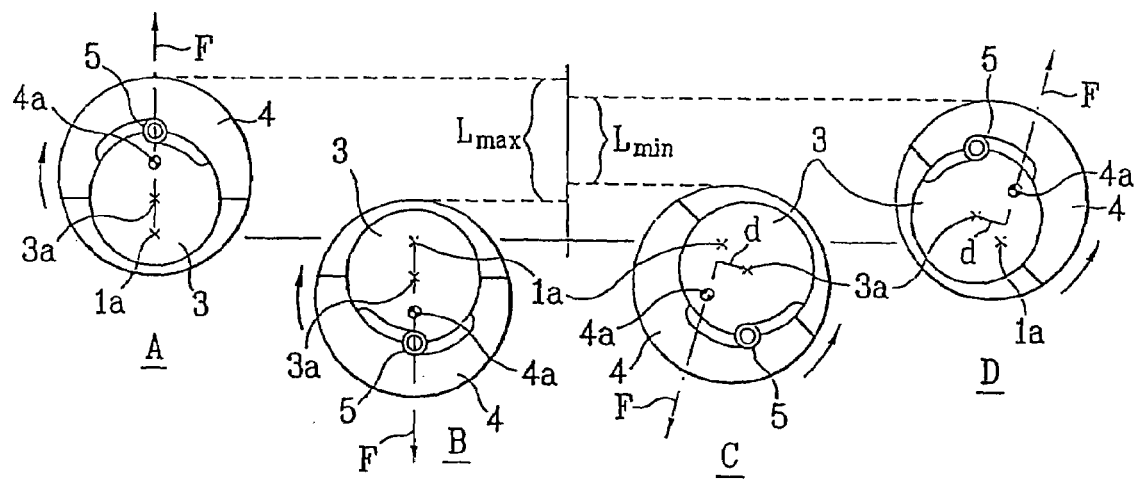
FIG. 2 illustrates the operation of the related art dual capacity compressor in FIG. 1, schematically.
Figure 3:
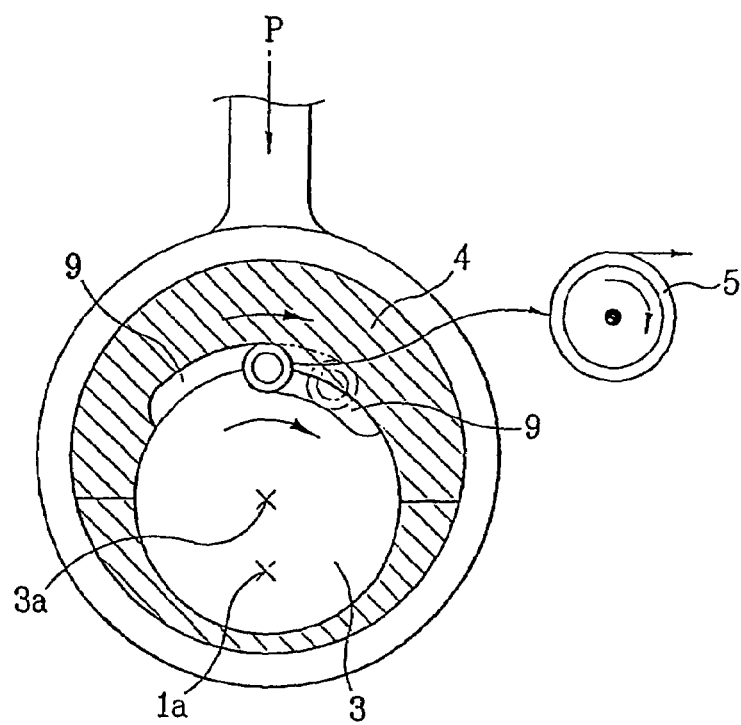
FIG. 3 illustrates a section of key parts of a related art dual capacity compressor showing relative rotation between the crank pin and the eccentric sleeve, schematically.
Figure 4:
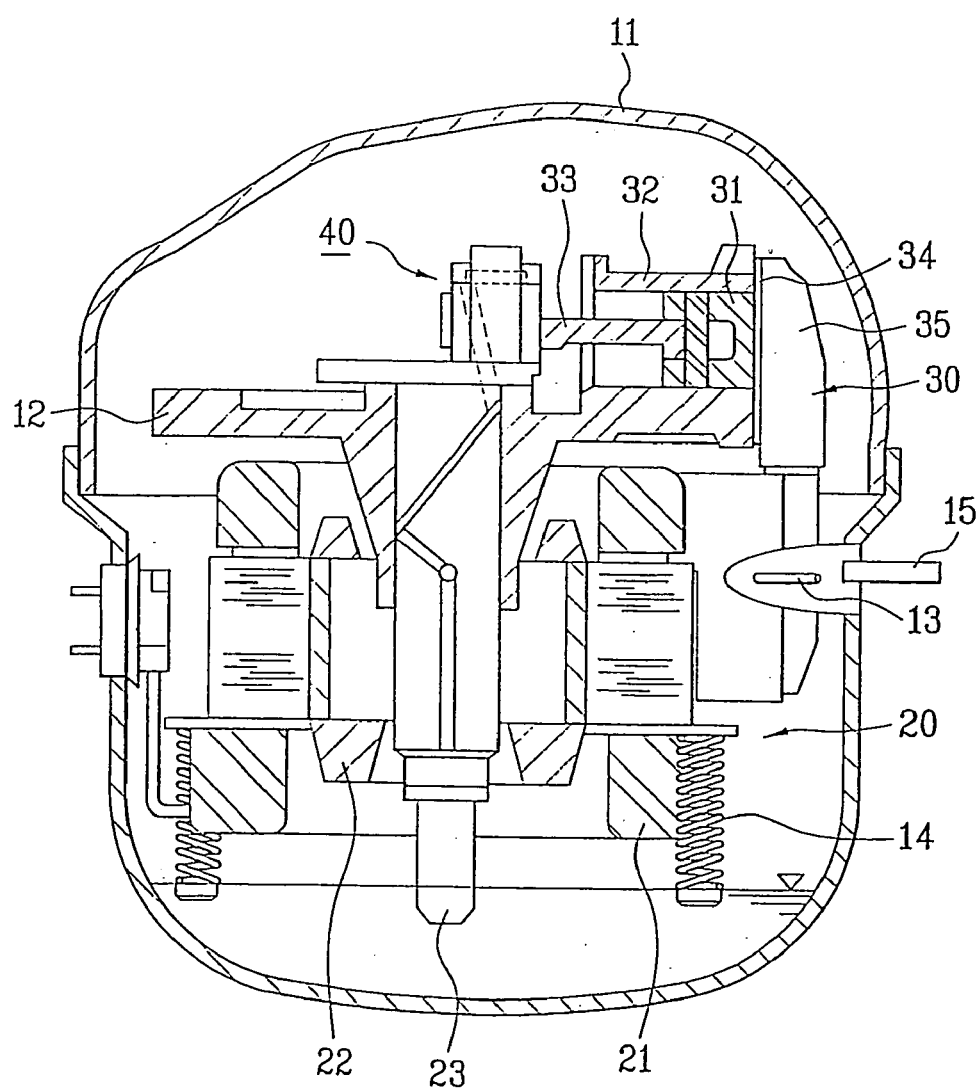
FIG. 4 illustrates a section of a dual capacity compressor in accordance with a preferred embodiment of the present invention.

Referring to FIG. 4, the dual capacity compressor of the present invention includes a power generating part 20 in a lower portion of the compressor for generating and transmitting a required power, and a compression part 30 over the power generating part 20 for compressing working fluid by using the power. Moreover, in addition to these general parts, the dual capacity compressor includes a stroke changing part 40 connected between the power generating part 20 and the compression part 30 for varying a compression capacity of the compression part 30 during operation In the meantime, there is a shell which encloses the power generating part 20 and the compression part 30 for preventing refrigerant from leaking, and there is a frame 12 elastically supported on a plurality of supporting members (i.e., springs) attached to an inside of the shell. There are a refrigerant inlet 13 and a refrigerant outlet 15 fitted to, and in communication with an inside of the shell.

The power generating part 20 under the frame 12 includes a motor with a stator 21 and rotator 22 for generating a rotating force by an external electrical power, and a crank shaft 23. The motor is reversible. The crank shaft 23 has a lower part inserted in the rotator 22 for transmission of a power, and oil holes or grooves for supplying lubrication oil held in the lower part to driving parts.

The compression part 30 is mounted on the frame 12 over the power generating part 20, and includes a mechanical driving part for compression of the refrigerant, and a suction and discharge valves for assisting the driving part. In addition to a cylinder 32 that actually forms a compression space, the driving part has a piston 31 for reciprocating in the cylinder 32, and a connecting rod 33 for transmission of reciprocating power to the piston 31. The valves receive and discharge refrigerant to/from the cylinder 32 in association with a cylinder head 34 and the head cover 35.

The stroke changing part 40 of the dual capacity compressor of the present invention will be described in detail, while description of the power generating part and the compression part, which are identical to the related art, are omitted.

Figure 5A:
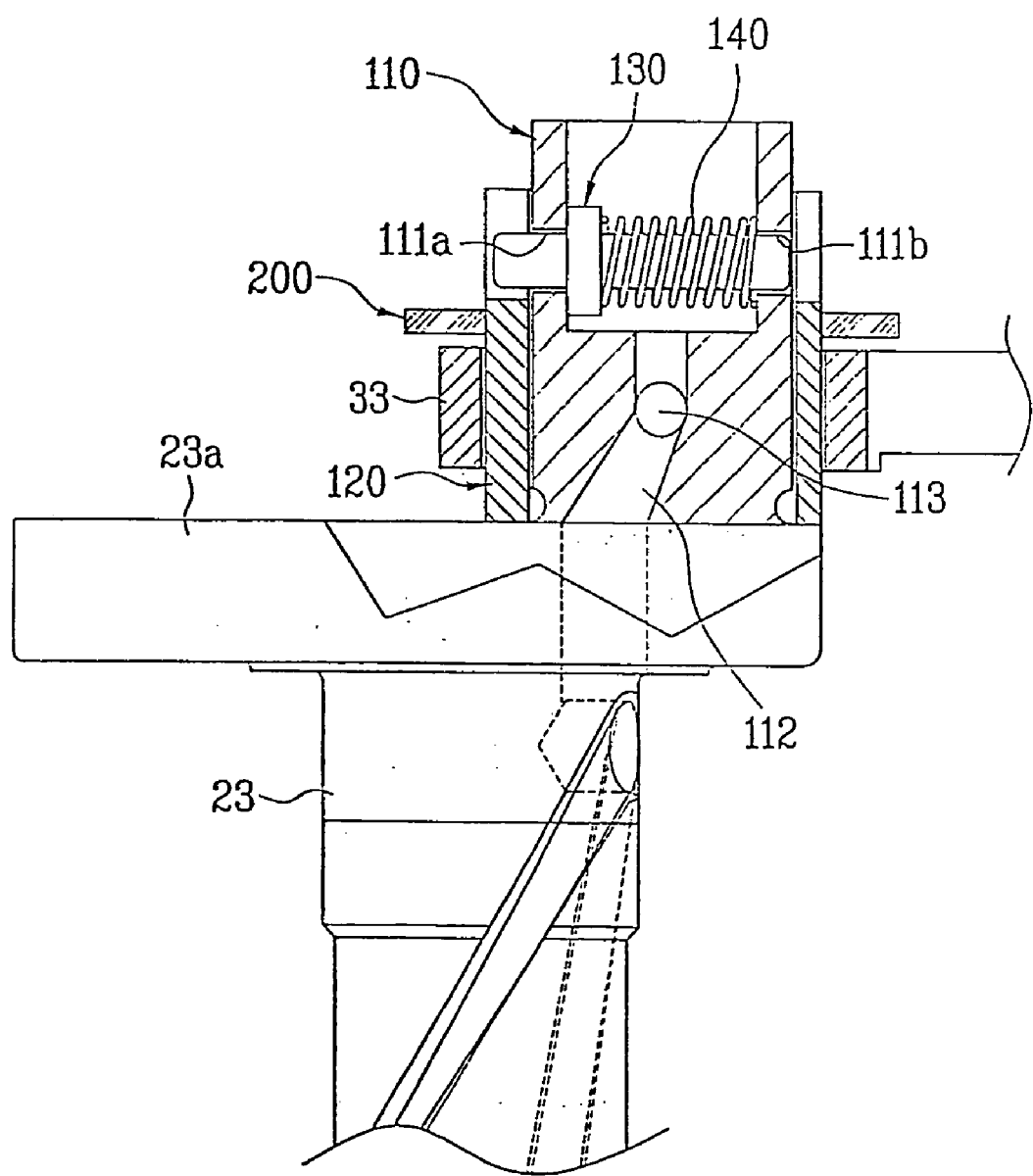
FIG. 5A illustrates a side view with a partial section of a dual capacity compressor in accordance with a first preferred embodiment of the present invention.

Referring to FIG. 5A, on the whole, the stroke changing part 40 includes a crank pin 110 on top of, and in eccentric to, the crank shaft, an eccentric sleeve 120 rotatably fitted between an outside circumferential surface of the crank pin 110 and the connecting rod 33, and a key member 130 fitted in the crank pin 110. The key member 130 holds the positions of the crank pin 110 and the eccentric sleeve 120 with respect to each other during operation of the compressor. In the stroke changing part 40, the eccentric sleeve 120 is arranged, and rotated so that an effective eccentricity thereof changes with rotation directions (regular or reverse direction) of the motor. For maintaining such a changed effective eccentricity, the key member 130 is held at the eccentric sleeve 120. Therefore, if the rotation direction of the motor changes by the stroke changing part 40, basically a stroke length of the connecting rod and a displacement of the piston change with the change of the effective eccentricity, and according to this the compression capacity also changes depending on the rotation direction. The stroke changing part 40 of the present invention described briefly will be described in more detail, with reference to the attached drawings.

Figure 5B:
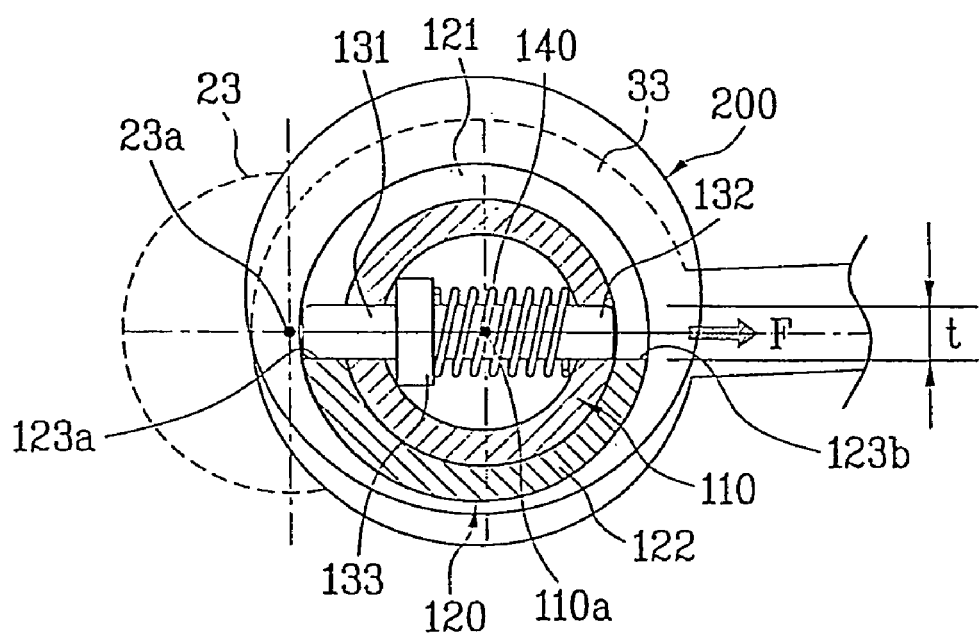
FIG. 5B illustrates a plan view with a partial section of a dual capacity compressor in accordance with a first preferred embodiment of the present invention.

FIGS. 5A and 5B illustrate side and plan views of dual capacity compressors of the present invention respectively, wherein components thereof are shown in assembled states with partial sections for easy description and clarity. FIGS. 6A~12 illustrate the components, separately.

Referring to FIG. 5A, the crank pin 110 is hollow partially, for fitting the key member 130 in the hollow, movably. The crank pin 110 also has one pair of key member fitting parts 111 formed opposite to each other, and an oil passage 112 and at least one oil supply hole 113 in a low part.

Figure 6A:
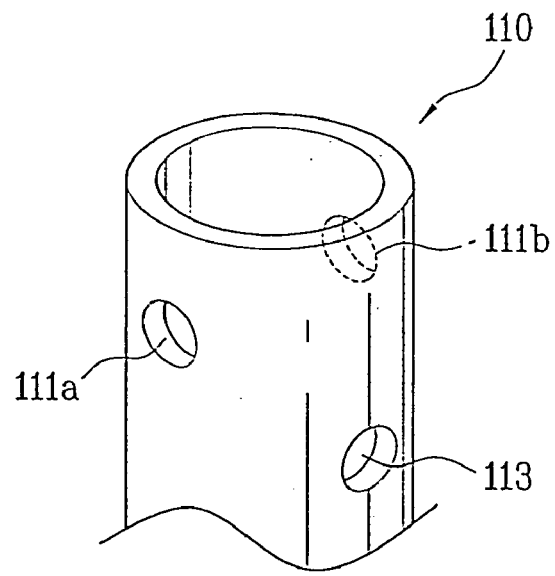
FIG. 6A illustrates a perspective view of a crank pin in accordance with a first preferred embodiment of the present invention.
Figure 6B:
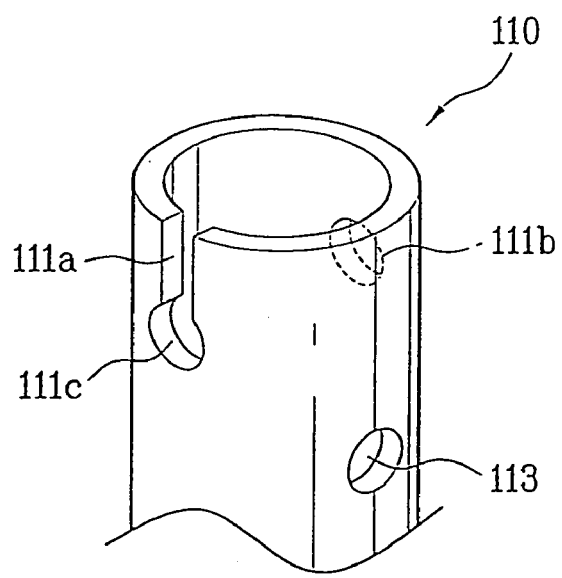
FIG. 6B illustrates a perspective view of a crank pin modified from one in FIG. 6A.

Referring to FIGS. 5A and 5B, the fitting parts 111a and 111b are formed in the hollow tube part so as to be disposed in a vertical plane containing the crank shaft axis 23a and the crank pin axis 110a. Accordingly, the key member 130 in the fitting parts 111a and 111b are influenced from a centrifugal force F exerting on the extension line between the axes 23a and 110a along a longitudinal direction of the key member 130. The key member 130 is movable by the centrifugal force F guided by the fitting parts 111a and 111b. As shown in FIG. 6A, the fitting parts 111a and 111b may actually form a pass through hole. The fitting parts 111 of the pass through hole can prevent the key member 130 from falling off during operation. Preferably, as shown in FIG. 6B, at least one of the fitting parts 111a and 111b may be a slot extended from a top end of a wall of the crank pin 110 to a position, for easy fitting of the key member 130 to the crank pin 110. It is more preferable that there is a seat part 111c at an end of the fitting part for stable fitting of the key member 130.

Figure 7A:
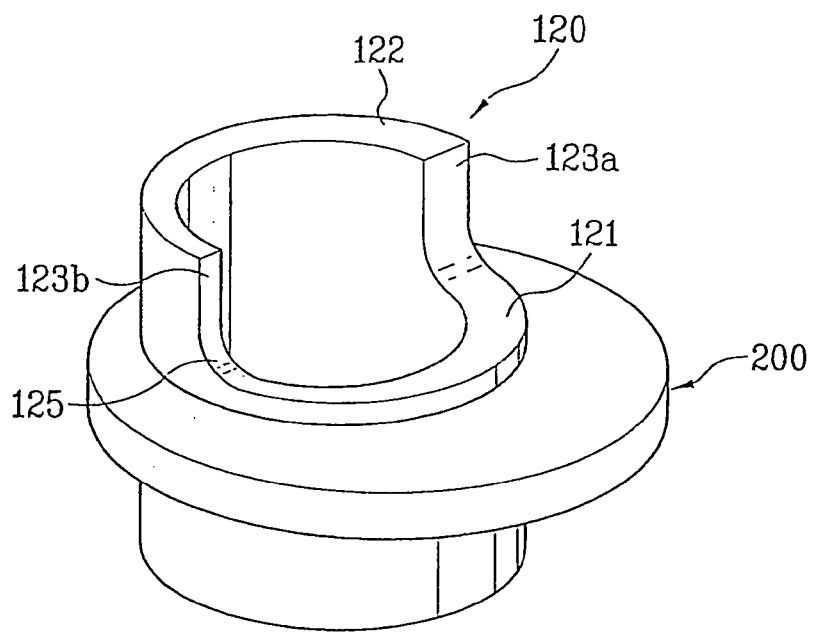
FIG. 7A illustrates a perspective view of an eccentric sleeve of the present invention.
Figure 7B:
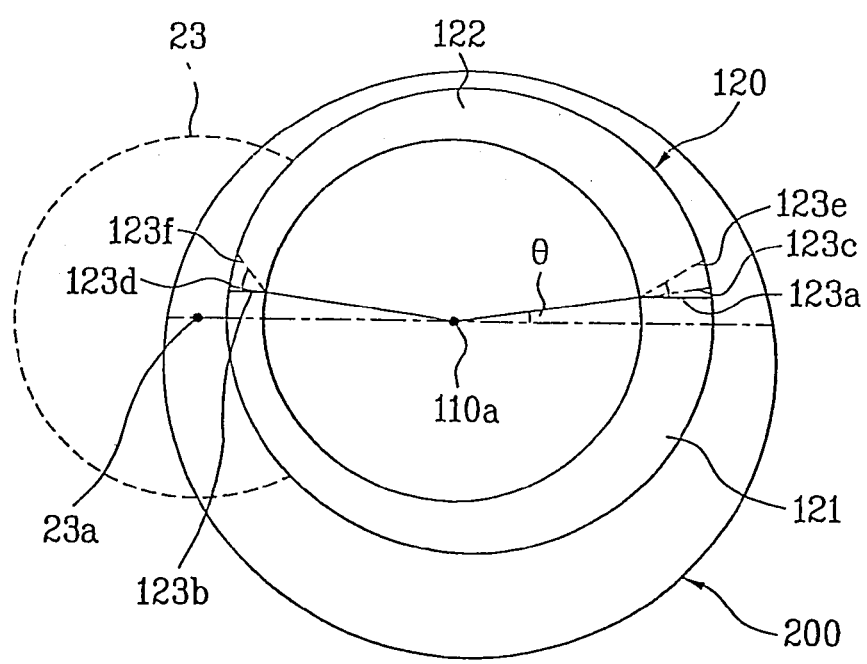
FIGS. 7B~7E illustrate variations of eccentric sleeves of the present invention, respectively.
Figure 7C:
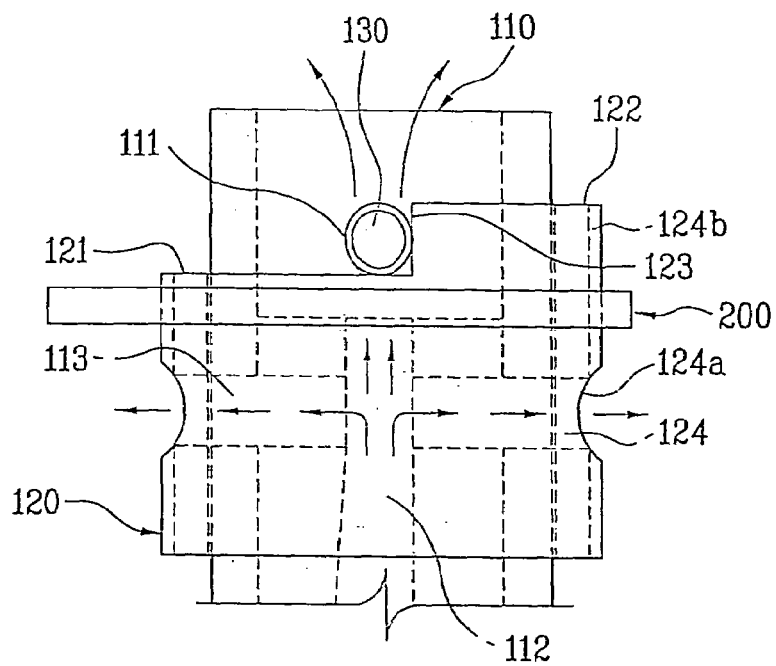
Figure 7D:
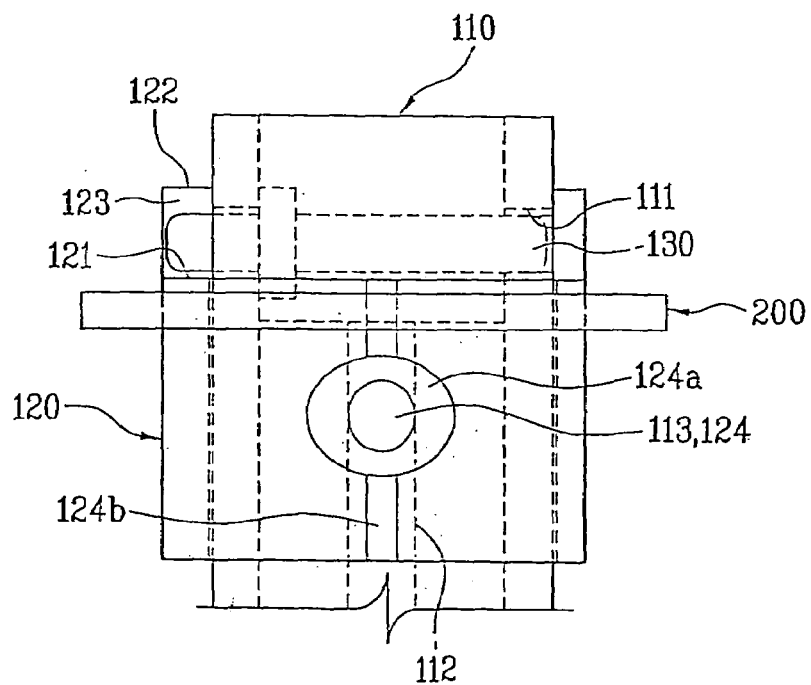

Referring to FIG. 5A, the oil passage 112 is hi communication both with the oil groove in outside surface of the crank shaft 23, and the first oil supply hole 113. The first oil supply hole 113 may be a through hole in any position of the crank pin 110. However, if the oil supply hole 113 is formed parallel to the fitting parts 111a and 111b, i.e., along an extension line connecting the fitting parts 111a and 111b, the oil supply hole 113 can reduce strength of the crank pin, significantly. Therefore, as shown in FIGS. 7C and 7D, the oil supply hole 113 is formed in a direction perpendicular to the extension line connecting the fitting parts 111a and 111b (i.e., an extension line between the axes 23a and 110a in FIG. 5B). Moreover, it is preferable that one pair of the first oil supply holes 113 are formed opposite to each other for uniform supply of lubricating oil between the crank pin 110 and the eccentric sleeve 120. The lubrication oil on the bottom of the compressor is at first passed through the oil groove and the oil passage 112, and sprayed from an upper end of the oil passage 112 so as to be supplied between contact surfaces of the components during operation for prevention of wear and smooth operation of the components, and may be supplied from the oil passage 112 to a gap between the crank pin 110 and the eccentric sleeve 120 directly through the oil supply hole 113. Preferably, the crank pin 110 is formed higher than the eccentric sleeve 120, for spraying the lubrication oil to the components evenly from a high position.

The eccentric sleeve 120 basically has an inside circumferential surface rotatably coupled to an outside circumferential surface of the crank pin 110, and an outside circumferential surface rotatably coupled to an end of the connecting rod 33. In more detail, as shown in 7A, the eccentric sleeve 120 includes a track part 121 formed along a circumference thereof, and a limiting part 122 for limiting a track of the track part 121. There are two steps 123a and 123b between the track part 121 and the limiting part 122. As shown in FIG. 5A, since at least a part of the key member 130 is projected so as to be held at the eccentric sleeve 120 when the compressor is not in operation, the track part 121 makes such a rotation of the eccentric sleeve 120 itself relative to the key member possible. That is, the eccentric sleeve 120 can rotate round the crank pin 110 as much as a range the track part 120 is formed therein. Opposite to the track part 121, the limiting part 122 limits rotation of the sleeve itself together with the key member 130 during stoppage and movement. Actually, the key member 130 is held at the steps 123a and 123b.

Figure 7E:
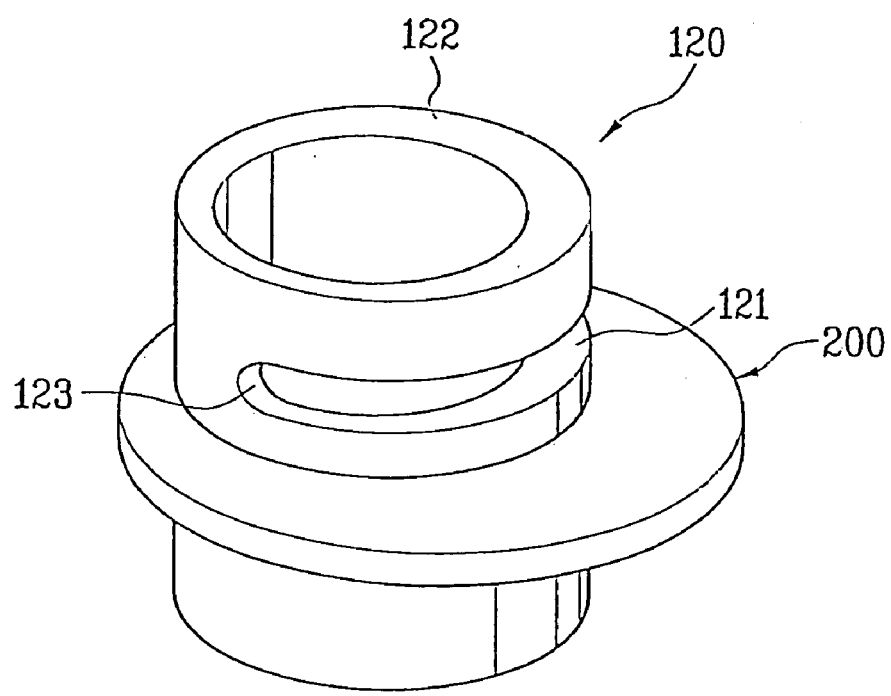

In the eccentric sleeve 120, the track part 121 may be a cut away part cut alone a circumference direction starting from a top end of the eccentric sleeve 120 to a required depth, actually. As shown in FIGS. 5B and 7B, the steps 123a and 123b are formed in parallel to an extension line between the crank shaft axis 23a and the crank pin axis 110a. That is, the steps 123a and 123b are actually formed in parallel to an extension line between a maximum thickness and a minimum thickness of the eccentric sleeve to have different widths, and the extension line is on the extension line between the axes 23a and 110a during operation of the compressor. In other words, the steps 123a and 123b are positioned on an extension line parallel to the extension line of the axes 23a and 110a at the same time. Consequently, the key member 130 disposed on the same extension line can be held at both of the steps 12a and 123b, such that the steps 123a and 123b form common contact surfaces for the key member 130, actually. Preferably, the steps 123a and 123b are spaced away from the extension line between the axes 23a and 110a by a half of a thickness 't' of the key member 130. According to this, the key member 130 can be held at the steps 123a and 123b more stably and accurately. On the other hand, the steps 123a and 123b may be formed to have slopes respectively each at an angle with respect to the extension line between the axes 23a and 110a. In more detail, the steps 123c and 123d may be formed in a radial direction extension line from the crank pin axis 110a sloped at an angle θ with respect to the extension line between the axes 23a and 110a. Also, the steps 123e and 123f may be sloped at an angle toward the limiting part centered on a cross point with an inside circumferential surface of the crank pin 110. Even in above cases, the steps 123c, 123d, 123e and 123f have common contact points with the key member 130, to enable engagement with each other. Moreover, the track part 121 may be, not only the cut away part as shown in FIG. 7A, but also a pass through hole extended to a length along a circumferential direction at a depth from the top end of the sleeve 120 as shown in FIG. 7E. The track part 121 of such a pass through hole holds the key member 130 so as not to break away in a vertical direction.

Other than this, referring to FIGS. 7C and 7D, the eccentric sleeve 120 may further include a second oil supply hole 124 formed at a height. The second oil supply hole 124 is formed to be in communication with the first oil supply hole 113 in the crank pin 110 when the compressor is in operation. In more detail, the key member 130 keeps holding the eccentric sleeve 120 when the compressor of the present invention is in operation. Therefore, as shown, it is basically preferable that the second oil supply hole 124 is in communication with the first oil supply hole 113 when the key member 130 holds the eccentric sleeve 10. Moreover, as described before, since the first oil supply hole 113 is perpendicular to the key member 130, it is required that the second oil supply hole 124 also perpendicular to the steps 123a and 123b in contact with the key member 130 for communication with the first oil supply hole 113. Furthermore, as shown in FIG. 7C, the eccentric sleeve 120 is arranged oppositely with reference to the key member 130 every time the rotation direction of the crank shaft changes, for changing eccentricity of the eccentric sleeve 120. Therefore, it is useful that the eccentric sleeve 120 has another second oil supply hole 124 opposite to the one second oil supply hole 124 in communication with the first oil supply hole 113. That is, the eccentric sleeve 120 becomes to have one pair of second oil holes 124 formed oppositely. At the end, either one of the two second oil supply holes 124 is in communication with the first oil supply hole 113 regardless of rotation direction when the compressor is in operation. The second oil supply holes keep in communication with the first oil supply hole 133, selectively depending on directions of rotation of the compressor. Therefore, the lubricating oil can be supplied to a gap between the eccentric sleeve 120 and the connecting rod 33, continuously during operation. In addition to this, a depth of oil cavity 124a is formed around the second oil supply hole 124, for forming a stand-by space for distributing the oil around the second oil supply hole 124, thereby making supply of lubrication oil between the eccentric sleeve 120 and the connecting rod 33 easy. Moreover, there is an oil groove 124b formed in an outside circumferential surface of the eccentric sleeve 120 extended in a vertical direction so as to be in communication with the second oil supply hole 124, so that the lubricating oil reaches to a top end, and a bottom end of the outside circumferential surface of the eccentric sleeve 120 from the second oil supply hole 124 along the oil groove 124b. According to this, the lubricating oil can be supplied between the eccentric sleeve 120 and the connecting rod 33 uniformly.

Referring to FIG. 7A again, preferably, the steps 123a and 123b between the track part 121 and the limiting part 122 are rounded. In more detail, as shown, there is a round portion 125 between the steps 123a and the track part 122. The key member 130 is supported on the round portion 125 when the key member 130 is held at the eccentric sleeve 120. A curvature of the round portion 125 is formed such that the round portion 125 comes into contact with the key member 130 in an area as large as possible. According to this, the key member 130 can be stably held at the eccentric sleeve 120 by the round portion 125. Moreover, owing to the round portion 125, the key member 130 can make, not point to point contact, but surface to surface contact, with the eccentric sleeve 120. Moreover, the round portion 125 strengthens the steps 123a and the 123b, actually. Therefore, even if the key member 130 and the eccentric sleeve 120 are brought into repetitive, and continual contact during operation of the compressor, neither the key member 130, nor the eccentric sleeve 120, is not broken due to stress concentration and fatigue caused thereby.

Figure 8:
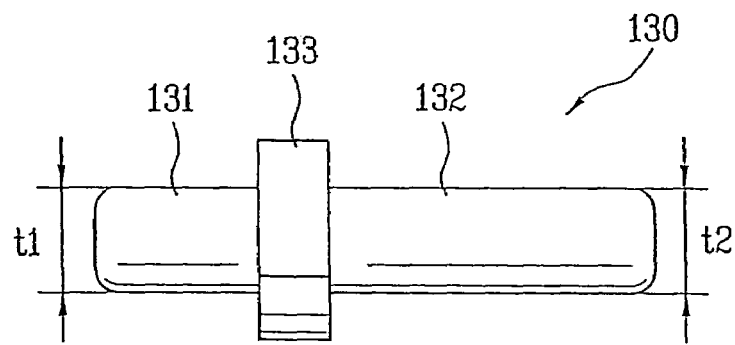
FIG. 8 illustrates a perspective view of a key member of the present invention.

FIG. 5A, 5B, or 8 illustrate the key member 130 in detail. As shown, basically the key member 130 has a first projection 131 to be projected for a length from the crank pin 110 even when the compressor is not in operation, and a second projection 132 to be projected for a length from the crank pin 110 when the compressor is in operation. The key member 130 also has a first stopper 133 for limiting a projection length of the first projection 131. Together with this, the key member 130 has an elastic member 140 for regulating a position of the key member 130 during the compressor is stopped or in operation. In the present invention, the key member 130 holds the eccentric sleeve 120 while the key member 130 is moved by the centrifugal force. Especially, as described before, the second projection 132 holds the eccentric sleeve 120 as the second projection 132 is projected during operation. For being projected by the centrifugal force generated during operation, it is required that the second projection 132 is directed to the same direction with a direction of the centrifugal force. Therefore, as shown, while the second projection 132 is positioned at outer sides of radii of the crank shaft 23 and the crank pin 110 relatively, the first projection 131 is positioned at inner sides of radii of the crank shaft 23 and the crank pin 110. In other words, actually, the second projection 132 is arranged in the crank pin 110 spaced away from the axis 22a of the crank shaft for receiving a great centrifugal force, and relative to this, the first projection 131 is arranged adjacent to the center 22a. Moreover, in order for the first and second projections 131 and 132 to hold the eccentric sleeve 120 at the same time when the compressor is in operation, it is preferable that the key member 130 has a length greater than an outside diameter of the crank pin 110.

In more detail, referring to FIG. 5A, the first projection 131 is projected from the crank pin 110 and engaged with one of the steps 123a and 123b regardless of operation state (stop or in operation) of the compressor, and maintains an engaged state even during operation of the compressor. For this, the elastic member 140 is fitted on the second projection 132 and supports the first stopper 133 elastically, together with an inside wall of the crank pin 110. A length of the projection of the first projection is limited as the first stopper 133 of the key member 130 interferes with the inside wall of the crank pin 110. For more stable operation, it is preferable that the length of the first projection is at least a half of a minimum width of the steps 123a and 123b. Also, as described before, since the first projection 131 is positioned at an inner side of a radial direction of the crank shaft 23 and the crank pin 110, the first projection 131 is projected toward the inner side of the radial direction, i.e., the axis 23a of the crank shaft, continuously. Therefore, the key member 130 is held at at least a part of the eccentric sleeve 120 relatively positioned at the inner side of radial direction of the crank shaft 23, always.

The second projection is projected in a direction opposite to the first projection, to engage with the other step during operation. According to this, the first and second projections 131 and 132 of the key member 130 engage with the eccentric sleeve 120 at the same time. The centrifugal force along the key member 130 becomes the greater gradually as the rotation speed of the crank shaft 23 becomes the faster to overcome the elastic force of the elastic member 140. According to this, the second projection is moved and projected in a direction of the centrifugal force (i.e., in a direction of an extension line between the axes 23a and 110a). In this instance, the eccentric sleeve 120 rotates round the crank pin 110 for changing eccentricity when the compressor changes a direction of rotation. Therefore, in order not to interfere the rotation of the eccentric sleeve 120, it is required that the second projection 132 has a length a tip of which does not project beyond an outside circumference of the crank pin 110 when the compressor is not in operation.

The first and second projections 131 and 132 are engaged with the steps 123a and 123b alternately depending on the rotation direction of the crank shaft. Since the key member 130 is arranged on the extension line between the axes 23a and 110a or at least parallel thereto, respective contact positions of the key member 130 to the steps 123a and 123b differ if thickness 't1' and 't2' of the first and second projections differ. Therefore, the thickness 't1' and 't2' of the first and second projections 131 and 132 are required to have the same thickness for accurate engagement with the steps 123a and 123b. Though a section of the key member 130 is circular in the drawing and description of the present invention, any form of the section, such as square or hexagonal, as far as that can make engagement with the steps 123a and 123b, may be used.

Figure 9:
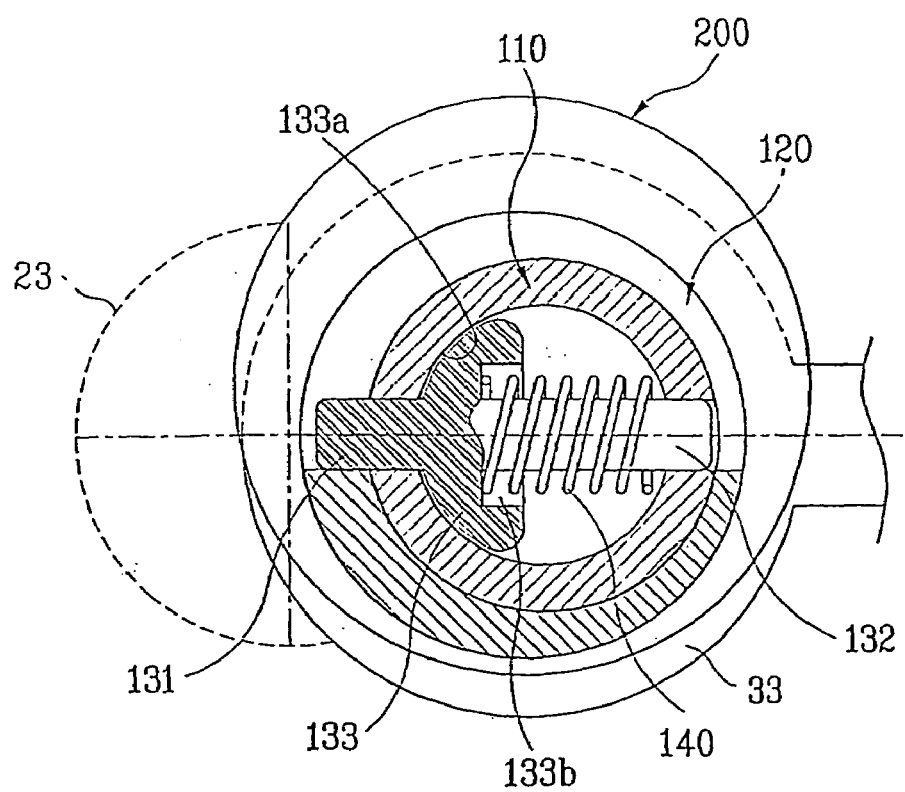
FIG. 9 illustrates a plan view of a variation of the key member to a crank pin in FIG. 8.

Referring to FIG. 9, a contact surface 133a of the first stopper 133 may have a form fit to an inside circumferential surface of the crank pin 100. According to this, the key member 130 can be engaged with the crank pin 110 exactly, and can make more smooth operation owing to an increased weight thereof (i.e., an increased centrifugal force makes an easy projection of the second projection 132). Preferably, the first stopper 133 may further include a recess 133b for making stable reception of the elastic member 140. Such contact surface 133a and the recess 133b supplement stable operation of the key member 230, actually. In the meantime, the first stopper 133 may be formed as a unit with the key member 130, or separately to be fitted to the key member 130. Examples of such separate type first stopper 133 are shown in FIGS. 10A and 10B.

Figure 10A:
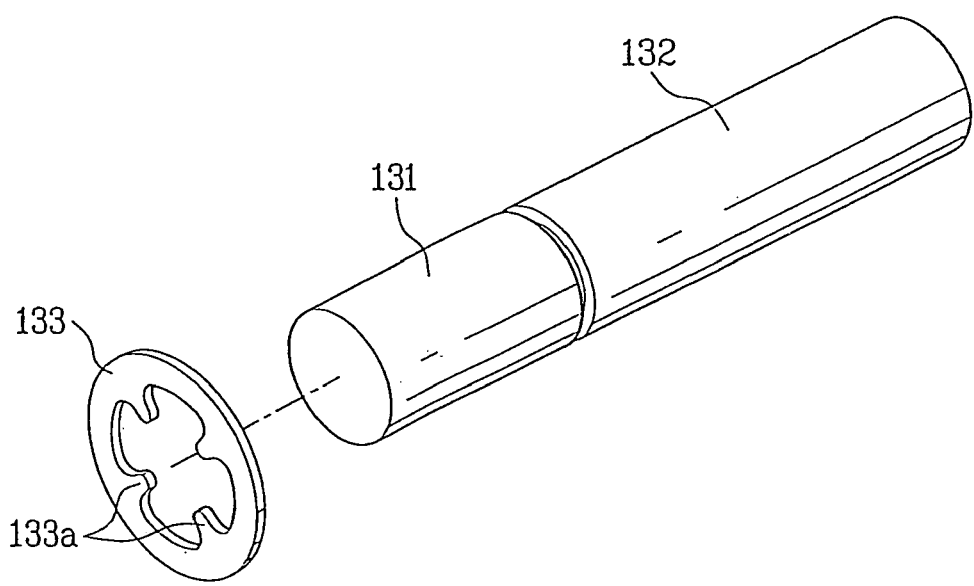
FIGS. 10A and 10B illustrate perspective views of variations of key members each having a detachable first stopper.
Figure 10B:
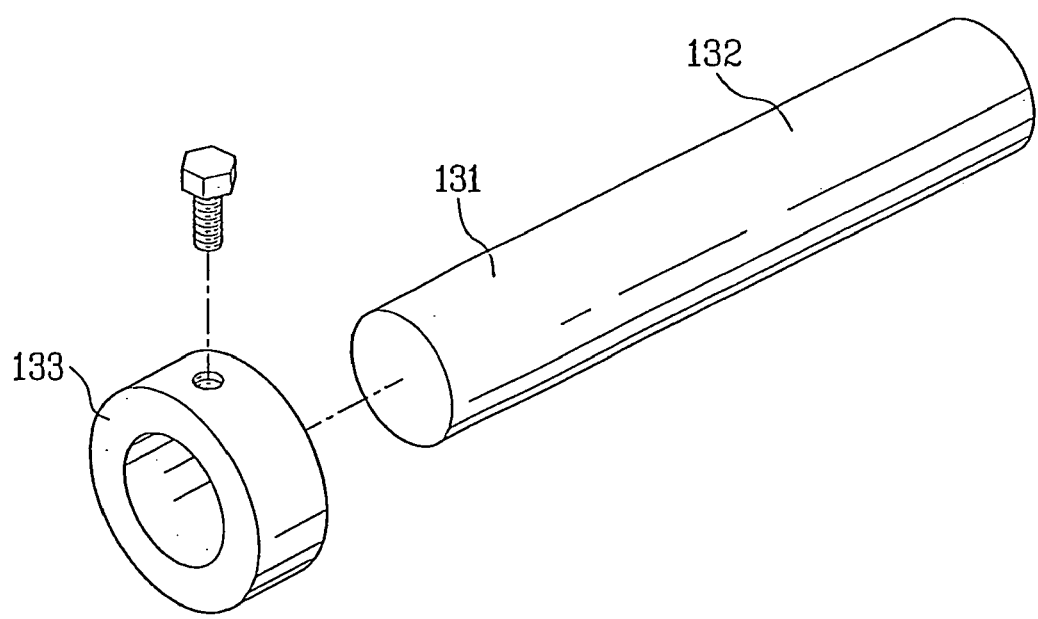

Referring to FIG. 10A, the first stopper 133 may include projections 133a extended inward in a radial direction. According to this, the first stopper 133 is fitted to the key member 130 as the projections 133a are inserted in a circumferential groove in a position of the key member 130. Or, as shown in FIG. 10B, the first stopper 133 of a simple ring member may be fastened to a position of the key member 130 with a fastening member. These separate type stoppers 133 enable fitting of the key member 130 to the crank pin 130 even when both of the key member fitting parts 111a and 111b are through holes. In more detail, by placing the stopper 133 on an inside of the crank pin 110, and inserting the key member 130 through the through holes, the stopper 133 and the key member 130 are engaged.

In the meantime, as described before, in the key member 130, the projection length of the second projection 132 in the key member 130 can be regulated by the elastic force of the elastic member 140 during regular operation. However, the transient sharp acceleration of the crank shaft 23 and the crank pin 110 at starting of the compressor causes a substantially great momentary centrifugal force exerted on the key member 130. It is liable that the second projection 132 is projected excessively by the centrifugal force enough to cause the first projection 131 broken away from the fitting part 111. Therefore, it is preferable that the key member 130 further includes a second stopper 134 for limiting the projection length of the second projection 133 beyond the crank pin 110 by the centrifugal force.

Figure 11A:
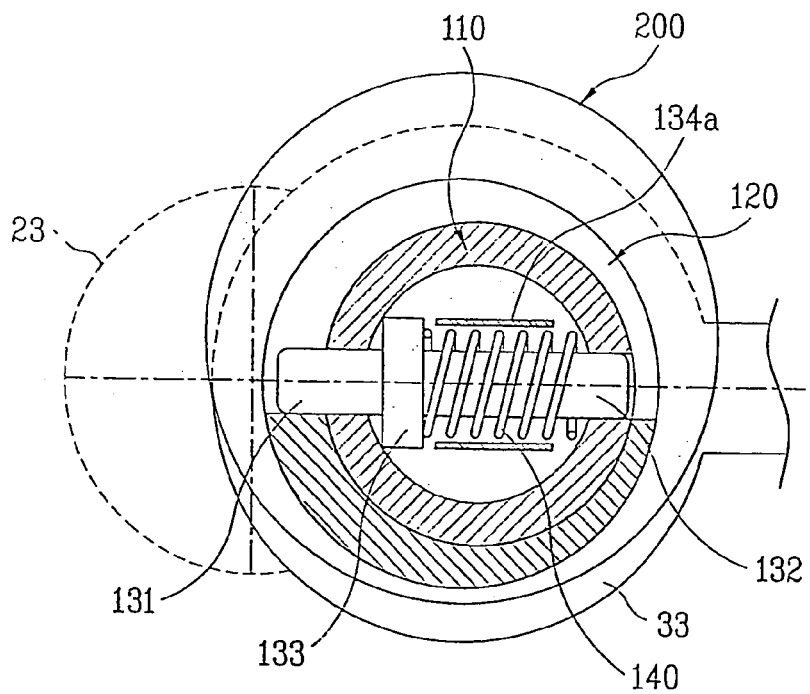
FIGS. 11A~11C illustrate plan views of variations of key members each having a second stopper.
Figure 11B:
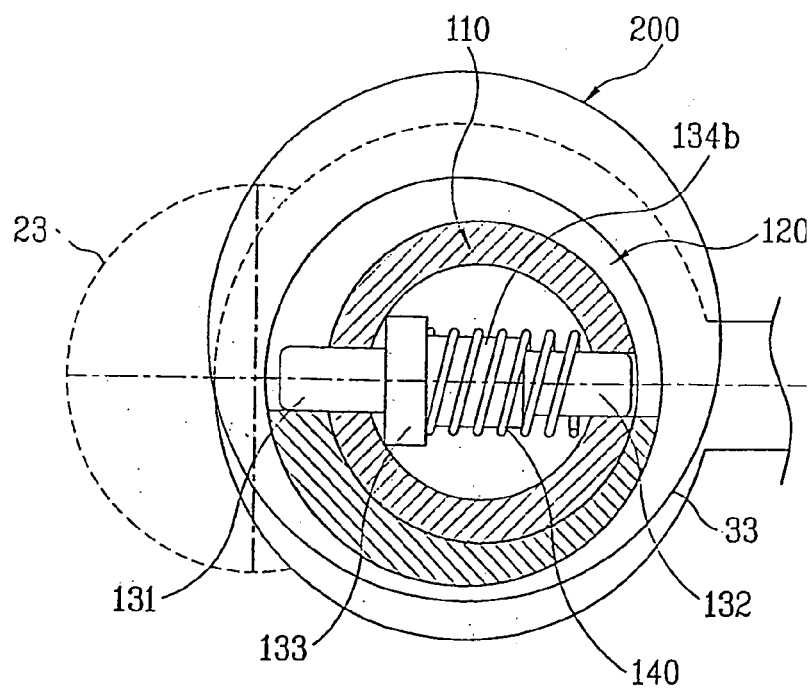
Figure 11C:
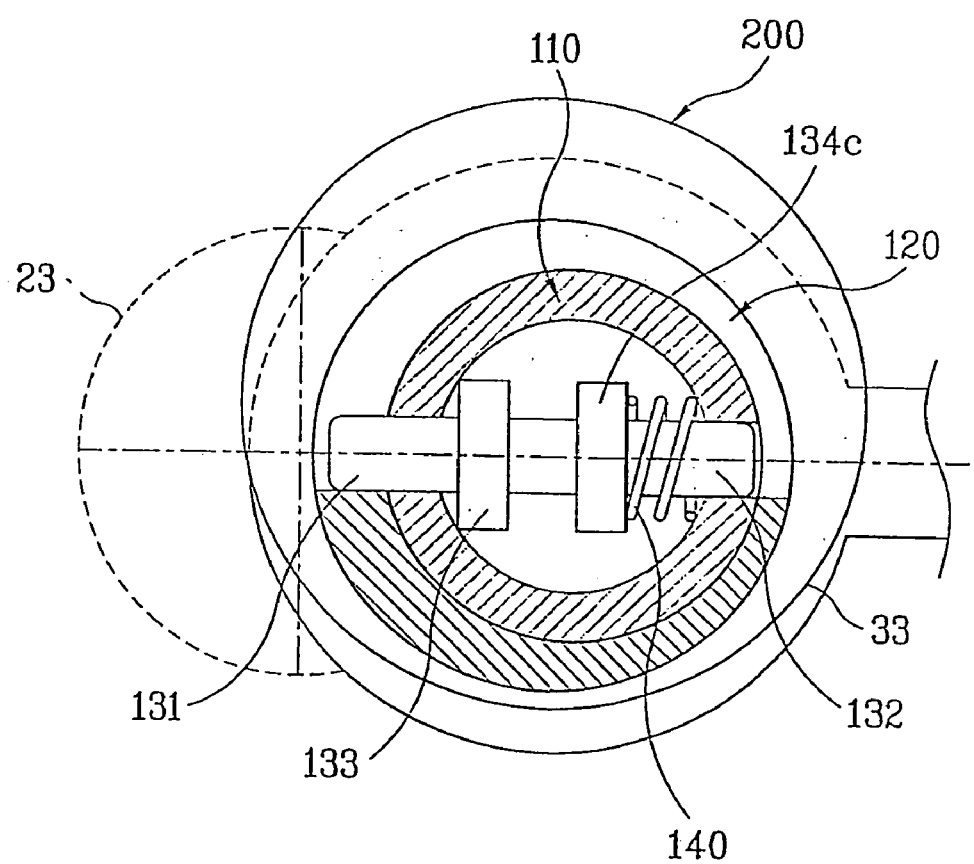

Referring to FIG. 11A, the second stopper 134 may be a hollow tube member 134a movably fitted on the second projection 132 in a length direction of the second projection 132. In this instance, the elastic member 140 is arranged between the second stopper 134a and the second projection 132. The second stopper 134a comes into contact both with the first stopper 133 and an inside wall of the crank pin 110 when the key member 130 moves in a direction of the centrifugal force, thereby preventing the second projection 133 from being projected more than a certain length. As shown in FIG. 11B, the second stopper 134 may be an extension 134b having a thickness at least greater than a thickness of the second projection 133. That is, the second stopper 134b in FIG. 11B is a lengthwise extension of the first stopper 133, actually. In this case, the elastic member 140 is fitted on an outside circumference of the second stopper 134b. Or, as shown in FIG. 11C, the second stopper 134 may be a radial direction extension 134c of the second projection to a required thickness, having a form similar to the first stopper 133, actually. In this case, the elastic member 140 is fitted between the second stopper 134b and the inside circumferential surface of the crank pin 110. Similar to variations to the first stopper 133 described with reference to FIGS. 10A and 10B, the stoppers 134b and 134c may be separate members fixed to the key member 130, respectively.

In summary, basically the key member 130 has a length greater than a diameter of the crank pin by at least a predetermined amount, and is movably fitted in the crank pin. At least a part of the key member 130 (i.e., the first projection) is projected from the crank pin even if the compressor is not in operation, and the other part thereof (the second projection) is projected from the crank pin 110 by the centrifugal force during the compressor is in operation. That is, the key member 130 is held at least at a part of the eccentric sleeve 120 continuously, and held at the eccentric sleeve 120 additionally when the compressor is in operation. Therefore, the key member 130 is in contact with the eccentric sleeve 120 at a plurality of points, and more particularly, the key member 130 is in contact with opposite ends of the eccentric member 120 set up with reference to a center line of any direction at the same time during operation, actually. Eventually, the key member 130 makes the eccentric sleeve 120 coupled with the rotating crank pin 110 positively in any direction rotation of the motor, thereby preventing the eccentric sleeve 120 and the crank pin 110 from moving relative to each other.

In the meantime, if the rotation direction of the crank shaft 23 changes, the eccentric sleeve 120 rotates around the crank pin 110 to change eccentricity and the piston stroke distance and the compression capacity. As shown in FIG. 12B, when the crank shaft 23 starts to turn, a friction force 'f' is generated between the crank pin 110 rotated with the crank shaft 23 and the connecting rod 33 stationary relative to the crank pin 110, i.e., on the eccentric sleeve 120 in a direction (a clockwise direction when the drawing is seen from above) opposite to the rotation direction (an anti-clockwise direction when the drawing is seen from above) of the crank shaft 23. In general, the rotation of the eccentric sleeve 120 is caused by such a relative friction force 'f' until one of the steps 123a or 123b of the eccentric sleeve is brought into contact with the first projection 131 from the key member. However, such a relative friction force 'f' overcomes friction forces between the eccentric sleeve 120 and the connecting rod 33, and between the eccentric sleeve 120 and the crank pin 110, and exerts on the eccentric sleeve 120. Due to this, the relative rotation force may not be enough to rotate the eccentric sleeve 120 smoothly depending on operation conditions. For an example, if supply of the lubricating oil between the crank pin 110, the eccentric sleeve 120, and the connecting rod 33 are not enough, friction forces between the members 110, 120, and 33 increase, such that the relative friction force 'f' can not rotate the eccentric sleeve 120. Or, if an abnormal external force exerts on the eccentric sleeve 120 through the connecting rod 33, the relative friction force 'f' can not overcome the external force enough to rotate the eccentric sleeve 120.

In those cases, the eccentric sleeve 120 can not be arranged at an accurate position to generate a required eccentricity change, failing in obtaining desired two different compression capacities. That is, the eccentric sleeve 120 fails to rotate adequately such that one of the steps 123a and the 123b is held at the first projection 131, leading the second projection 132 to fail in holding the other step, and thereby holding the eccentric sleeve 120, positively. Therefore, in the present invention, an eccentric mass 200 configured to make smooth rotation of the eccentric sleeve 120 is provided to the eccentric sleeve 120.

Figure 12A:
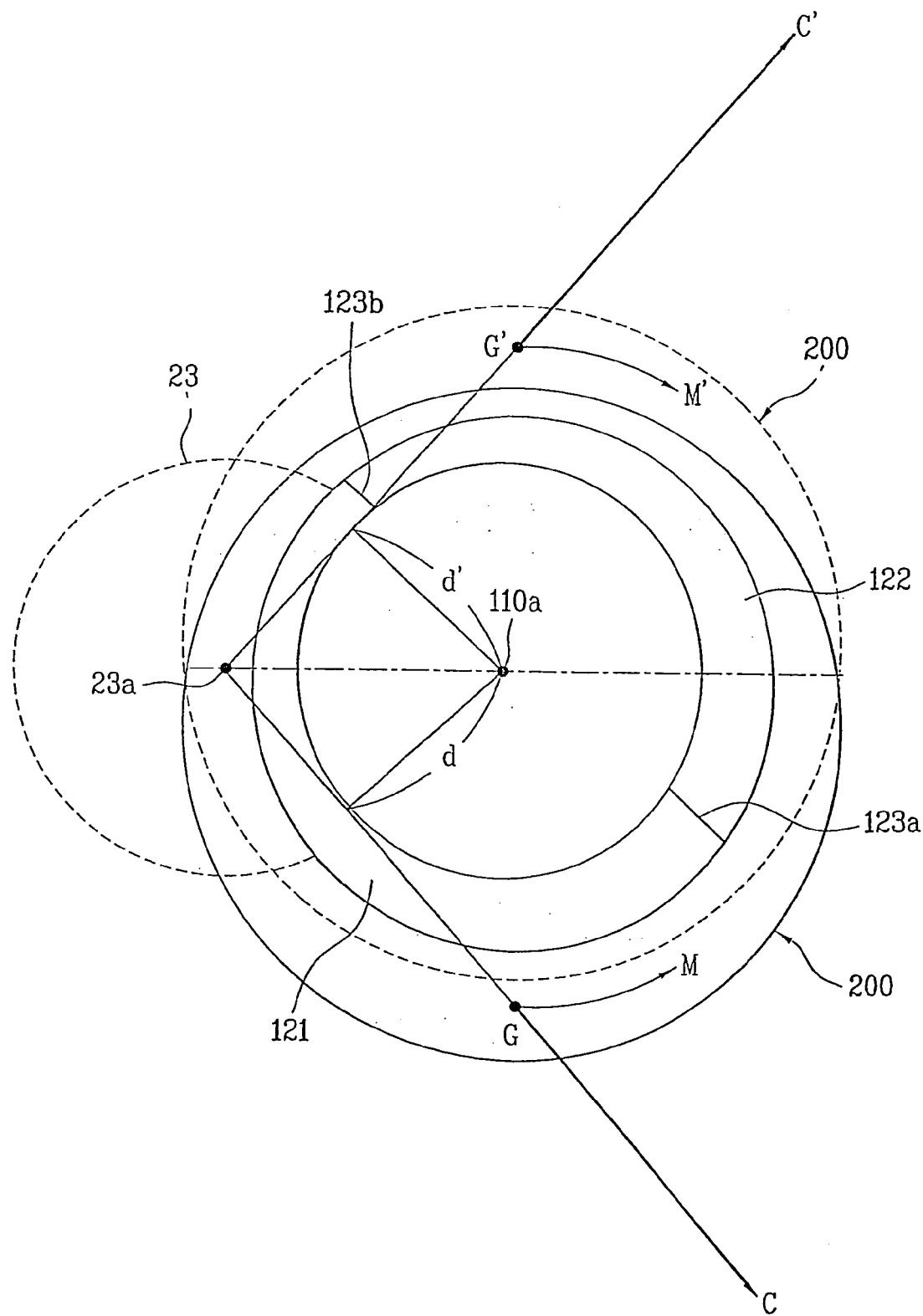
FIGS. 12A and 12B illustrates plan views each showing a relation between eccentric masses of the present invention versus forces caused by the eccentric masses.
Figure 12B:
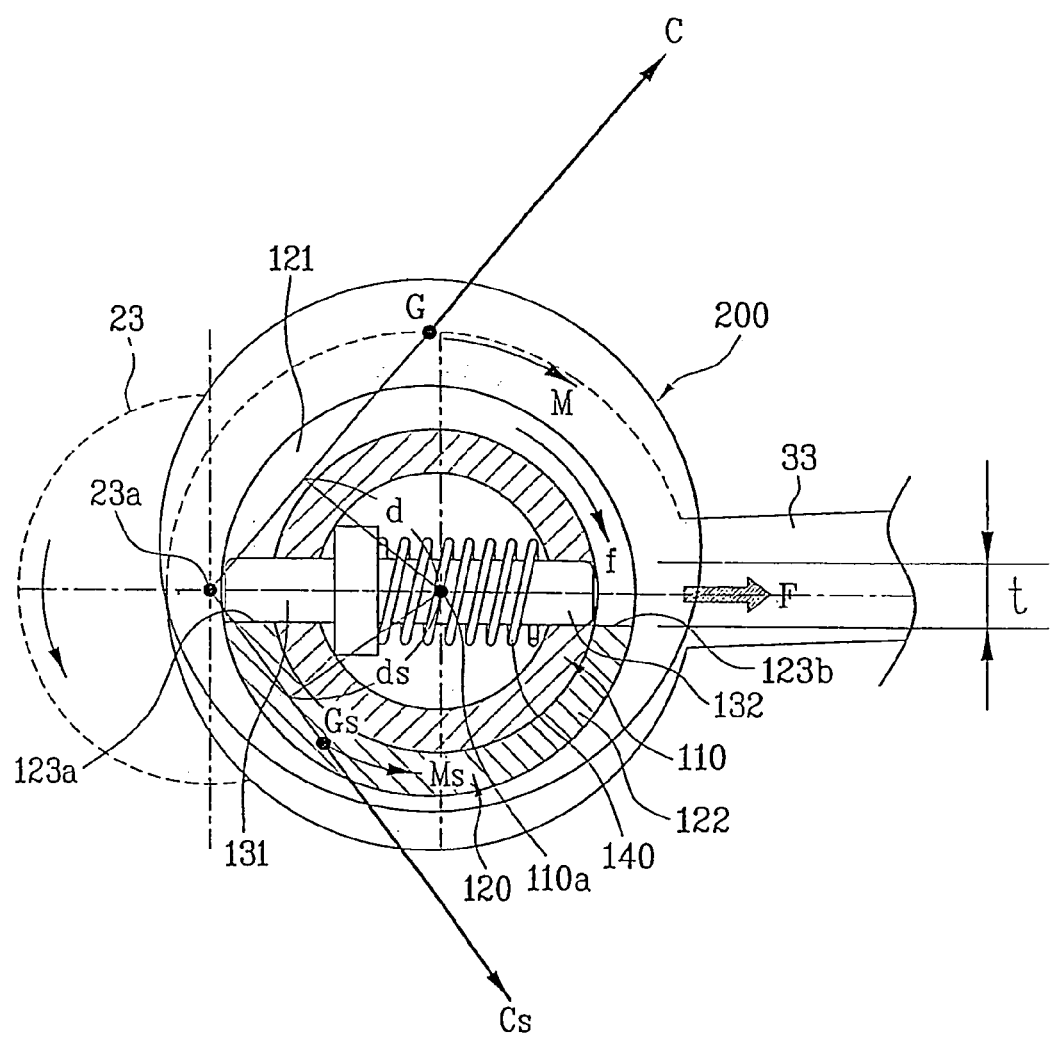

Referring to FIG. 12A, the eccentric sleeve 200 is eccentric to the eccentric sleeve 120, and, therefore, has an eccentric center of gravity G. When the crank shaft 23 starts to turn, a centrifugal force 'C' exerts on the center of gravity 'G' along an extension line between the axis 23a of the crank shaft and the center of gravity 'G'. Since the center of gravity 'G' is spaced significantly far from the axis 23a of the crank pin which is a center of rotation of the eccentric sleeve 120, a length 'd' of an arm is perpendicular to the extension line from the axis 23a of the crank pin. Therefore, the centrifugal force 'C' generates a local rotation moment 'M' owing to the length 'd' of the arm, to rotate the eccentric sleeve 120 in a clockwise direction. The rotation moment 'M' caused by the eccentric mass 200 is substantially great, enough to rotate the crank sleeve 120 around the crank pin 110 stably even under any external disturbance. Accordingly, the eccentric sleeve 120 keeps rotating, to be held at the key member 130, more precisely, at the first projection 131, and produce an accurate eccentricity required for the change of the compression capacity. Alternatively, as shown in a dashed line, the eccentric mass 200 may be arranged at the eccentric sleeve 120, symmetrically. In this case too, when the crank shaft 23 starts to turn, a centrifugal force 'C'' exerts on a center of gravity 'G'', and rotation moment 'M'' is generated owing to a length 'd'' of an arm. Alikely, the rotation moment 'M'' rotates the eccentric sleeve 120 stably, such that the sleeve 120 is held at the first projection 131 of the key member. Therefore, even if the eccentric mass 200 is arranged at any part of the eccentric sleeve 120, the eccentric mass 200 generates the rotation moment, and rotates the eccentric sleeve 120.

As described before, referring to FIG. 12B, the friction force 'f' exerts on the eccentric sleeve 120 during rotation of the crank shaft 23. If a direction of the friction force 'f' is opposite to the direction of the rotation moment 'M', the friction force 'f' offsets the rotation moment 'M', resulting to interfere rotation of the eccentric sleeve. Therefore, it is preferable that the eccentric mass 200 is arranged at the eccentric sleeve 120 such that the eccentric mass 200 generates the rotation moment 'M' in a direction the same with the friction force 'f'. That is, in a preferred embodiment of the present invention, the eccentric mass 200 is configured to rotate the eccentric sleeve 120 in a direction the same with the direction of the friction for 'f'. Moreover, since the friction force 'f' exerts in a direction opposite to the rotation direction of the crank shaft 23, preferably, the eccentric mass 200 rotates the eccentric sleeve 120 in a direction opposite to a direction of rotation of the crank shaft 23.

Moreover, as shown, the eccentric sleeve 120 has an eccentric center 'Gs' of gravity, not only owing to its own non-uniform thickness, but also owing to the track part 121 formed by cutting out. That is, the center of gravity 'Gs' is positioned on the limiting part 122 that is heavier. Therefore, during rotation of the crank shaft 23, a centrifugal force 'Cs' exerts on an extension line between the center of gravity 'Gs' of the eccentric sleeve 120 and the axis 23a of the crank shaft. Due to the eccentricity of the center of gravity 'Gs', the centrifugal force 'C' generates a rotation moment 'Ms' caused by a perpendicular distance between the extension line and the axis 110a of the crank pin 110a, i.e., a length 'ds' of an arm. The rotation moment 'Ms' always exerts in a direction the same with a rotation direction of the crank shaft 23. That is, as shown in FIG. 12B, during anti-clockwise direction rotation of the crank shaft 23, the rotation moment 'Ms' is generated at the eccentric sleeve 120 in the anti-clockwise direction by the center of gravity 'Gs'. Furthermore, though not shown, during clockwise direction rotation of the crank shaft 23, a rotation moment 'Ms' is generated in the clockwise direction. As described, the friction force 'f' rotates the eccentric sleeve 120 in a direction opposite to the rotation direction of the compressor, until the eccentric sleeve 120 is held at the first projection 131. However, the rotation moment Ms tends to rotate the eccentric sleeve 120 in the rotation direction of the compressor. Even when the moment 'M' caused by the eccentric mass 200 exerts on the eccentric sleeve 120, the moment 'Ms' rotates the eccentric sleeve 120 in a direction opposite to the direction of rotation caused by the eccentric mass 200, finely and intermittently. Therefore, the fine rotation of the eccentric sleeve 120 interferes the projection and holding of the second projection 132 for perfect holding of the eccentric sleeve 120. Since such an unstable action is caused by unbalance of weight of the eccentric sleeve 120, it is preferable that the eccentric mass 200 is arranged at a light part of the eccentric sleeve 120. That is, as shown in FIG. 12B, the eccentric sleeve 200 is arranged adjacent to the track part 121. Such eccentric mass 200 shifts the center of gravity 'Gs' of the eccentric sleeve 120 to a position adjacent to the axis 110a of the crank pin, and minimizes the length ds of the arm, to eliminate an influence of the rotation moment 'Ms' from the eccentric sleeve 120. According to this, fine rotation of the eccentric sleeve 120 is prevented, making the second projection 132 held at the eccentric sleeve 120, more stably, by its own centrifugal force 'F'. Moreover, as shown, the eccentric mass 200 at the limiting part 121 generates a rotation moment in a direction the same with a direction of the friction force 'f', i.e., opposite to the rotation direction of the crank shaft 23, to rotate the eccentric sleeve 120. Therefore, the eccentric sleeve 200 at the limiting part 121 is the most preferable in the rotation of the eccentric sleeve 120 to an accurate position, and sustaining the eccentric sleeve 120 to be at the accurate position.

The eccentric mass 200 may be arranged at any position as far as the eccentric mass 200 can generate the rotation moment by means of the centrifugal force. For an example, an eccentric mass of a great specific gravity may be provided in a hole formed in the eccentric sleeve 120. However, such a provision of the eccentric sleeve requires a larger eccentric sleeve 120, resulting to increase other members engaged with the eccentric sleeve 120. Therefore, preferably, as shown in FIG. 5A, the eccentric mass 200 is arranged on an outside circumferential surface of the eccentric sleeve 120, which is made of a thin plate member for avoiding interference with other adjacent members. The eccentric mass 200 may be formed as one unit with the eccentric sleeve 120, when the eccentric mass 200 is an extension from the outside circumferential surface of the eccentric sleeve 120. Or, the eccentric mass 200 may be formed separate from the eccentric sleeve 120, and fixed to the outside circumferential surface of the eccentric sleeve 120. The eccentric mass 200 may be arranged on or under the eccentric sleeve 120 without interference with the connecting rod 33. However, as shown in FIG. 5A, the eccentric mass 200 on the eccentric sleeve 120 can prevent the connecting rod 33 from breaking away upward from the eccentric sleeve 120.

Figure 13A:
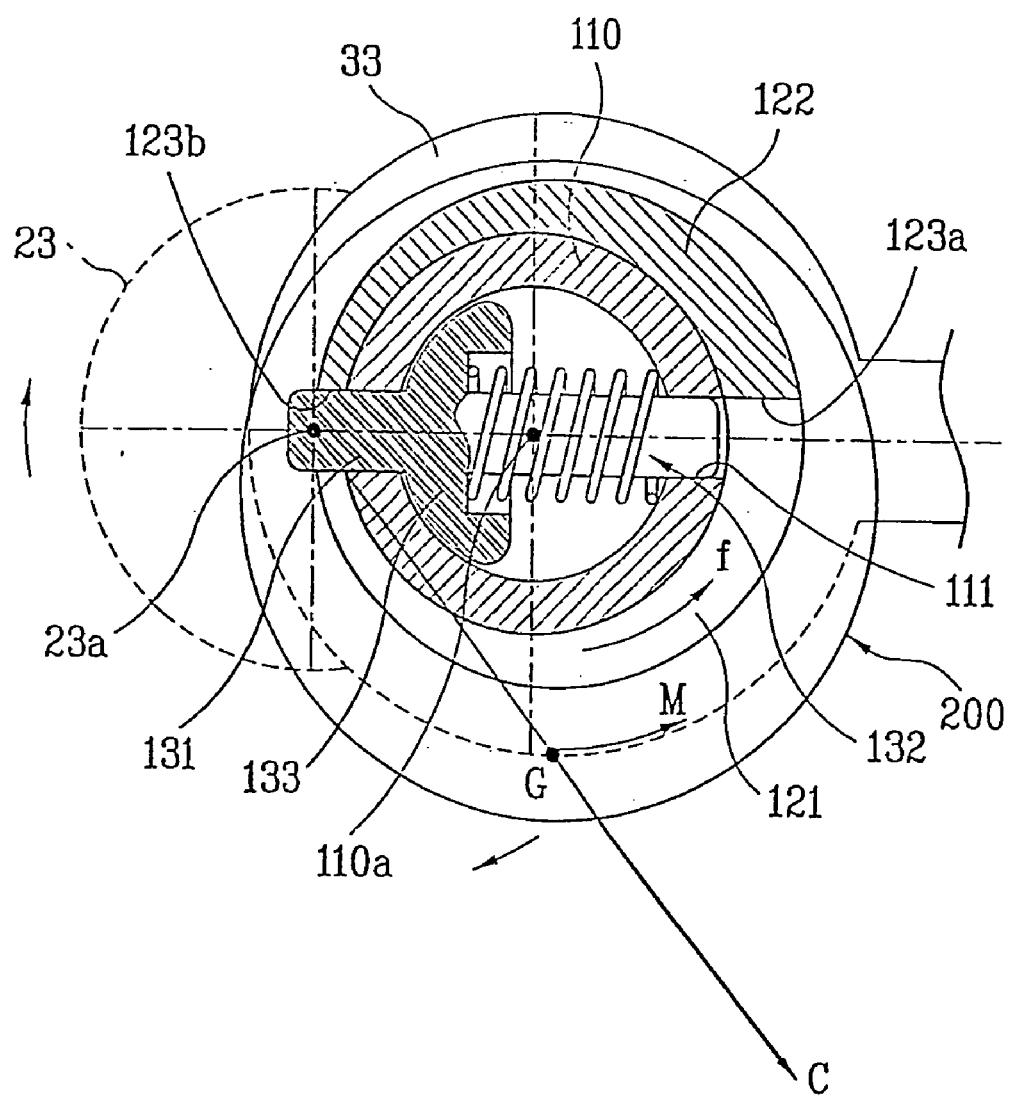
FIGS. 13A and 13B illustrate plan views each showing operation of the dual capacity compressor of the present invention in a clockwise rotation thereof.
Figure 13B:
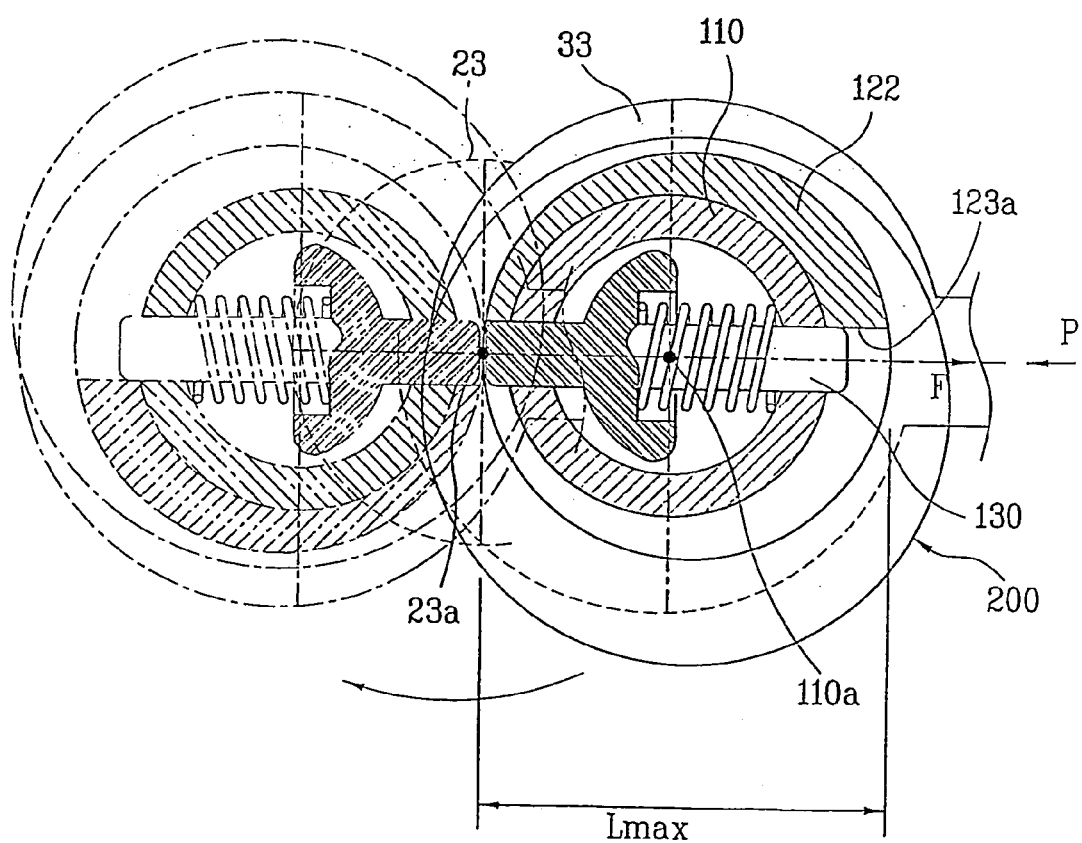
Figure 14A:
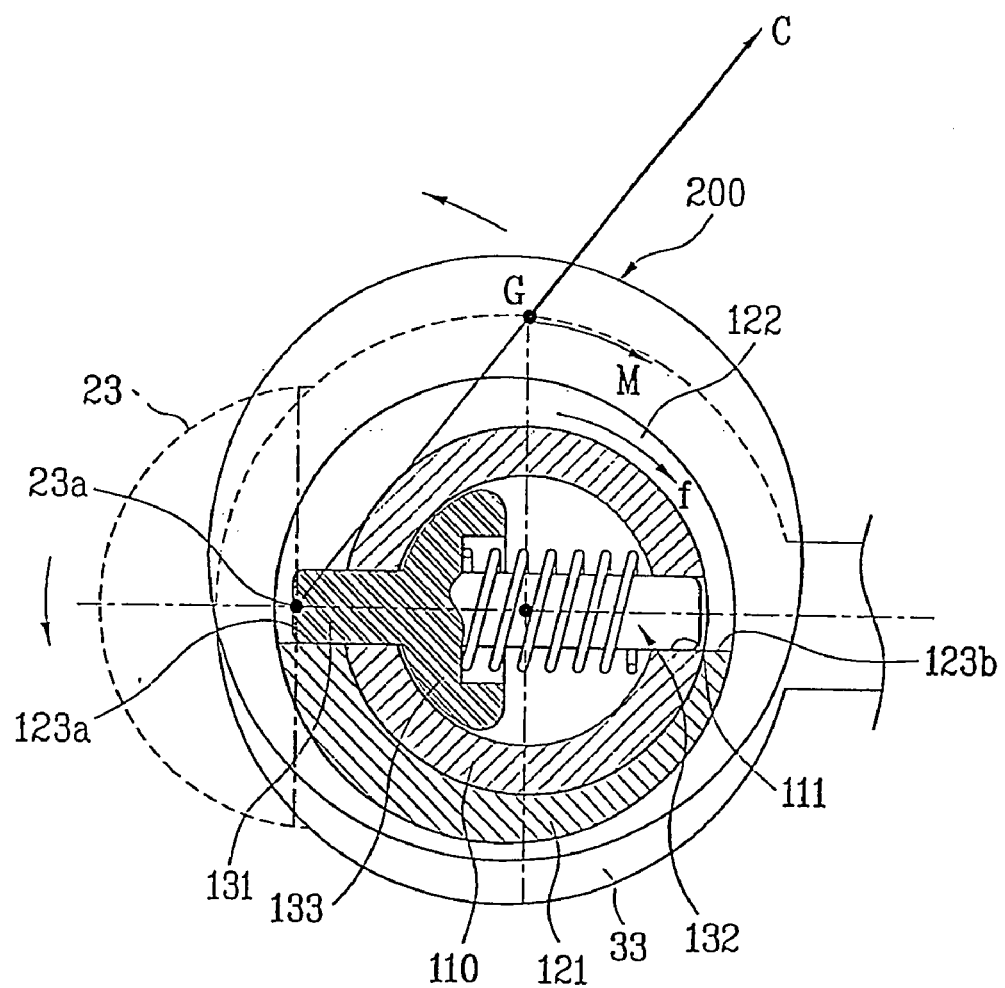
FIGS. 14A and 14B illustrate plan views each showing operation of the dual capacity compressor of the present invention in an anti-clockwise rotation thereof.
Figure 14B:
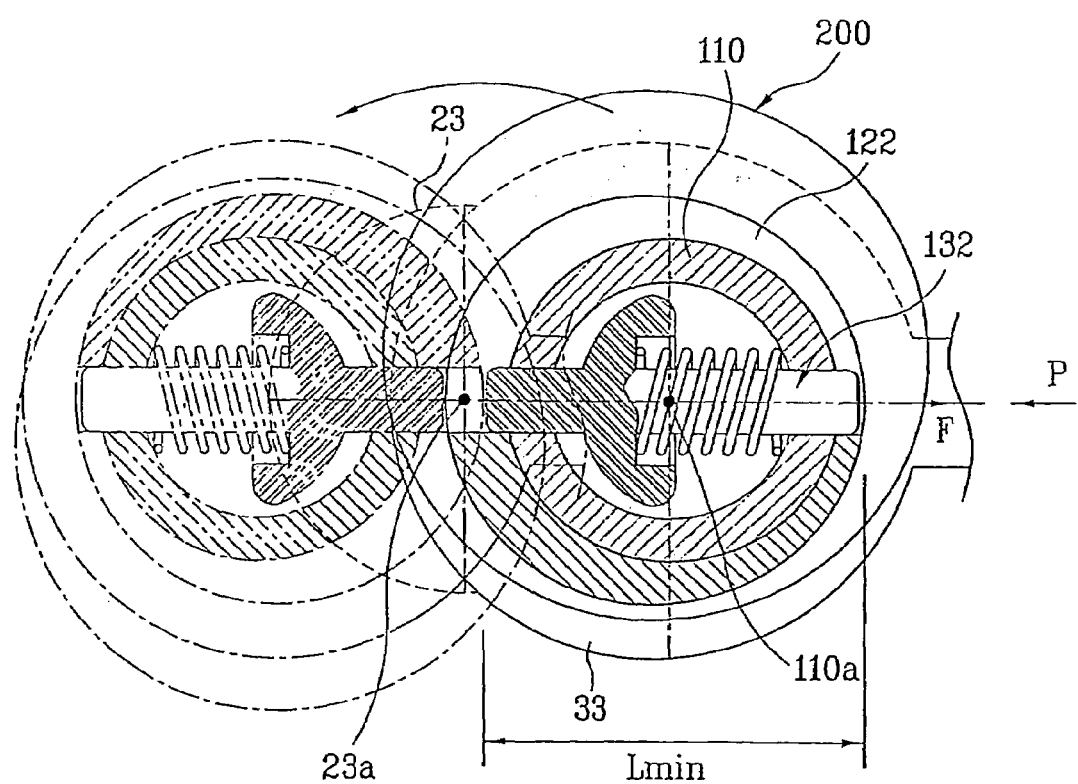

The operation of the dual capacity compressor will be described with reference to the attached drawings. FIGS. 13A and 13B illustrate plan views each showing operation of the dual capacity compressor of the present invention in a clockwise rotation thereof, and FIGS. 14A and 14B illustrate plan views each showing operation of the dual capacity compressor of the present invention in an anti-clockwise rotation thereof.

FIG. 13A illustrates a plan view showing relative positions of the key member 130 and the eccentric sleeve 120 when the crank shaft 23 starts to turn in a regular, i.e., the clockwise direction. As described, the first projection 131 is always projected beyond the crank pin 110 to an inward radial direction of the crank pin 110 by the elastic force. When the crank shaft 23 starts to rotate in the clockwise direction in a state the first projection 131 is projected, the crank pin, the eccentric sleeve, and the key member 110, 120, and 130 are start to revolve around the axis of the crank shaft. During the revolution, the relative friction force 'f' is generated between the crank pin 110 and the connecting rod 33 in a direction opposite to the rotation direction of the crank shaft. The eccentric sleeve 120 rotates around the crank pin 110a in an anti-clockwise direction by the friction force 'f'. At the same time with this, the rotation moment 'M' is generated by the centrifugal force 'C' generated at the center of gravity 'G' of the eccentric mass 200, and rotates the eccentric sleeve 120 in the anti-clockwise direction more smoothly, together with the friction force 'f'. According to this, the step 123b on the thin side of the eccentric sleeve is held at the projected first projection 131, positively. Once the crank shaft 23 rotates, since the friction force 'f' and the rotation moment 'M' are generated continuously, the holding between the first projection 131 and the step 123 is continued. As shown in FIG. 13B, if rotation speed reaches to a certain level, the key member 130 moves following the extension line between the axes 23a, and 110a by the centrifugal force 'F'. According to this, the second projection 132 engages with the step 123a on the thick side, while the contact between the first projection 131 and the step 123b is maintained. This simultaneous multi-point contact enables the key member 130 to make a positive engagement with the eccentric sleeve 120. Therefore, in the regular direction rotation, even if the external force 'P' coming from re-expansion of the working fluid after compression, or other force is applied through the connecting rod 33, the relative rotation between the crank pin 210 and the eccentric sleeve 220 is prevented. Even if there is a local rotation moment generated at the eccentric sleeve 120, the relative rotation of the eccentric sleeve 110 with respect to the crank pin 110 can be prevented. As shown in FIG. 13B, a solid line part in the drawing illustrates a top dead center state, a dashed line part in the drawing illustrates a bottom dead center state, and the eccentric sleeve 120 arranged such that the eccentric sleeve 120 generates a maximum eccentricity between a piston (not shown) connected to the connecting rod 33 and the crank pin 110 in the case of regular direction rotation. According to this, the piston reciprocates a maximum stroke length Lmax, and the compressor of the present invention has the maximum compression capacity.

In the meantime, when the crank shaft 23 starts to turn in the reverse, i.e., in the anti-clockwise direction, the relative friction force 'f' is generated between the crank pin 110 and the connecting rod 33 in a direction opposite to the rotation direction, i.e., in the clockwise direction, to generate the rotation moment 'M' in a direction the same with the eccentric mass 200. The eccentric sleeve 120 rotates in the clockwise direction around the axis 110a of the crank pin starting from a position shown in FIG. 13A by the friction force 'f' and the moment 'M', and, as shown in FIG. 14A, has the step 123a on the thick side engaged with the first projection 131. Alikely, during rotation of the crank shaft 23, the engagement between the first projection 131 and the, step 123a are sustained by the friction force 'f' and the moment 'M'. Identical to the regular direction rotation, as shown in FIG. 14B, when the rotation speed reaches to a certain level, the second projection 12 engages with the step 123b on the thin side by the centrifugal force 'F', such that a multi-point contact is made between the eccentric sleeve 120 and the key member 130. Therefore, in the reverse direction rotation, relative rotation between the crank pin 110 and the eccentric sleeve 120 can be prevented, even if the external force 'P' caused by the pressure of the working fluid applied to the piston during compression, and other force is applied thereto. Moreover, as shown in FIG. 14B, in the case of the reverse direction rotation, since the eccentric sleeve 120 is arranged to have a minimum eccentricity, the piston reciprocates in a minimum stroke length Lmin, and the compressor of the present invention has a minimum compression capacity.

At the end, the compressor of the present invention can make stable operation even in any operation states, i.e., in regular and reverse direction rotations, by eliminating relative rotation between elements that are made to maintain the eccentricity by the key member 130, i.e., the crank pin 110 and the eccentric sleeve 120.

Moreover, the eccentric sleeve 120 is made to rotate, and engage with the key member 130 smoothly by the eccentric mass 200. That is, the eccentric mass 200 serves to arrange the eccentric sleeve 120 at a required position accurately such that the eccentricity is changed, properly.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The multi-point contact between the eccentric sleeve and the key member during operation permits positive engagement of the crank pin and the eccentric sleeve through the key member, such that any external, or internal cause can make relative movement between the eccentric sleeve and the crank pin, thereby permitting a stable operation of the compressor without variation of an output. That is, since the eccentricity is constant, a designed compression capacity can be obtained, without change. Moreover, a friction loss caused by relative rotation between the crank pin and the eccentric sleeve is prevented. At the end, such a stable operation brings about an increase of an efficiency of the dual capacity compressor. In addition to this, noise occurred in the relative rotation can be prevented, and lifetimes of the components can be increased.

The rotation moment generated by the eccentric mass at the eccentric sleeve permits smooth rotation, and change of the eccentricity of the eccentric sleeve. Accordingly, the eccentric sleeve is arranged at a required position accurately so as to change the eccentricity and the compression capacity before the eccentric sleeve is held completely by the key member, thereby increasing an operative reliability of the compressor of the present invention.

What is claimed is:

1. A dual capacity compressor comprising:
    a power generating part including a reversible motor and a crank shaft inserted in the motor;
    a compression part including a cylinder, a piston in the cylinder, and a connecting rod connected to the piston;
    a crank pin in an upper part of the crank shaft eccentric to an axis of the crank shaft;
    an eccentric sleeve having an inside circumferential surface rotatably fitted to an outside circumferential surface of the crank pin, and an outside circumferential surface rotatably fitted to an end of the connecting rod;
    a key member for positive fastening of the eccentric sleeve to the crank pin in all rotation directions of the motor; and
    an eccentric mass provided to the eccentric sleeve for rotating the eccentric sleeve around the crank pin,
    thereby providing different compression capacities by re-arranging the eccentric sleeve that changes an effective eccentricity and a piston displacement following change of a direction of rotation of the motor, and preventing relative motion between the crank pin and the eccentric sleeve during operation by means of the key member actually regardless of the direction of rotation of the motor.

2. The dual capacity compressor as claimed in claim 1, wherein the key member is held at at least a part of the eccentric sleeve continuously, and designed to be held at the eccentric sleeve, additionally.

3. The dual capacity compressor as claimed in claim 1, wherein the key member holds the eccentric sleeve at a plurality of points.

4. The dual capacity compressor as claimed in claim 1, wherein the key member holds the eccentric sleeve at two points set up with reference to a center line in any direction during operation.

5. The dual capacity compressor as claimed in claim 1, wherein the key member has a length greater than an outside diameter of the crank pin.

6. The dual capacity compressor as claimed in claim 1, wherein the crank pin includes one pair of key member fitting parts formed opposite to each other.

7. The dual capacity compressor as claimed in claim 1, wherein the key member fitting parts of the crank pin are through holes in a wall of the crank pin.

8. The dual capacity compressor as claimed in claim 1, wherein the crank pin further includes at least one first oil supply hole for supplying oil between the eccentric sleeve and the crank pin.

9. The dual capacity compressor as claimed in claim 8, wherein the first oil supply hole is formed in the crank shaft so as to be in communication with an oil passage for supplying oil to various moving parts of the compressor.

10. The dual capacity compressor as claim 8, wherein the at least one first oil hole has one pair of first oil supply holes formed in the crank pin opposite to each other.

11. The dual capacity compressor as claimed in claim 1, wherein the eccentric sleeve includes;
a track part formed along a circumference thereof for enabling rotation of the eccentric sleeve itself relative to the projection of the key member, and
a limiting part formed relative to the track part for limiting rotation of the projection of the key member.

12. The dual capacity compressor as claimed in claim 11, wherein the track part of the eccentric sleeve is a cut away part cut along a circumferential direction at a depth from a top thereof.

13. The dual capacity compressor as claimed in claim 11, wherein the track part of the eccentric sleeve is a pass through hole extended along a circumferential direction to a length at a depth from the top thereof.

14. The dual capacity compressor as claimed in claim 11, wherein the steps formed between the track part and the limiting part is parallel to an extension line connecting an axis of the crank shaft and an axis of the crank pin.

15. The dual capacity compressor as claimed in claim 14, wherein the step is spaced apart from an extension line connecting the axis of the crank shaft and the axis of the crank pin as much as a distance equal to a half of a thickness of the key member.

16. The dual capacity compressor as claimed in claim 8, wherein the eccentric sleeve further includes at least one second oil supply hole in communication with the first oil supply hole in the crank pin.

17. The dual capacity compressor as claimed in claim 16, wherein the second oil supply hole is in communication with the first oil supply hole, selectively.

18. The dual capacity compressor as claimed in claim 11, wherein the step between the limiting part and the track part is rounded.

19. The dual capacity compressor as claimed in claim 16, wherein the eccentric sleeve further includes oil cavities formed in an outside circumferential surface thereof around the second oil supply hole.

20. The dual capacity compressor as claimed in claim 16, wherein the eccentric sleeve further includes an oil groove extended from the second oil supply hole vertically in the outside circumferential surface.

21. The dual capacity compressor as claimed in claim 1, wherein the key member includes;
a first projection for projection for a length from the crank pin even when the compressor is not in operation, and
a second projection for projection for a length from the crank pin when the compressor is in operation.

22. The dual capacity compressor as claimed in claim 21, wherein the second projection has such a length that a tip thereof is not projected beyond the outside circumference of the crank pin when the compressor is not in operation.

23. The dual capacity compressor as claimed in claim 1, wherein the key member includes a stopper for limiting movement of the key member within the key member fitting parts.

24. The dual capacity compressor as claimed in claim 1, wherein the key member further includes an elastic member for supporting the key member such that at least a part of the key member is kept projected out of the crank pin regardless of operation of the compressor.

25. The dual capacity compressor as claimed in claim 23, wherein the stopper has a crank pin contact surface in conformity with an inside circumferential surface of the crank pin.

26. The dual capacity compressor as claimed in claim 23, wherein the stopper is a first stopper for limiting one direction movement of the key member.

27. The dual capacity compressor as claimed in claim 23, wherein the stopper further includes a second stopper for limiting the other direction movement of the key member.

28. The dual capacity compressor as claimed in claim 1, wherein the eccentric mass rotates the eccentric sleeve so as to be held at a part of the key member.

29. The dual capacity compressor as claimed in claim 1, wherein the eccentric mass generates a rotation moment with a centrifugal force for rotating the eccentric sleeve.

30. The dual capacity compressor as claimed in claim 1, wherein the eccentric mass rotates the eccentric sleeve in a direction the same with a relative friction generated at the eccentric sleeve.

31. The dual capacity compressor as claimed in claim 1, wherein the eccentric mass rotates the eccentric sleeve in a direction opposite to a rotation direction of the crank shaft.

32. The dual capacity compressor as claimed in claim 1 or 11, wherein the eccentric mass is provided to a part of the eccentric sleeve, of which weight is light, relatively.

33. The dual capacity compressor as claimed in claim 32, wherein the eccentric mass is arranged adjacent to the track part of the eccentric sleeve.

34. The dual capacity compressor as claimed in claim 1, wherein the eccentric sleeve is a plate member provided to the outside circumferential surface of the eccentric sleeve.

35. The dual capacity compressor as claimed in claim 1, wherein the eccentric mass is formed as one unit with the eccentric sleeve.

36. The dual capacity compressor as claimed in claim 1, wherein the eccentric mass is formed separate from the eccentric sleeve, and fixed to the eccentric sleeve.

37. The dual capacity compressor as claimed in claim 1, wherein the eccentric mass arranged on an upper part of the eccentric sleeve.

* * * * *